(12) United States Patent
Davis et al.

(10) Patent No.: US 10,822,050 B2
(45) Date of Patent: *Nov. 3, 2020

(54) PEDAL WITH CUFF LOCKING AND UNLOCKING MECHANISM

(71) Applicant: Vectus Sport, San Jose, CA (US)

(72) Inventors: Gregory William Davis, San Jose, CA (US); Robert Edward Glaspie, Tehachapi, CA (US)

(73) Assignee: Vectus Sport, San Jose, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 16/011,368

(22) Filed: Jun. 18, 2018

(65) Prior Publication Data

US 2019/0382077 A1 Dec. 19, 2019

(51) Int. Cl.
*B62M 3/08* (2006.01)

(52) U.S. Cl.
CPC .................................. *B62M 3/083* (2013.01)

(58) Field of Classification Search
CPC ...................................................... B62M 3/083
See application file for complete search history.

(56) References Cited

U.S. PATENT DOCUMENTS

| 527,349 | A | * | 10/1894 | Scognamillo | .......... | B62M 3/086 |
| 615,679 | A | * | 12/1898 | Condell | ................ | B62M 3/083 |
| | | | | | | 74/594.4 |
| 622,543 | A | * | 4/1899 | Scherff | .................. | B52M 3/086 |
| 638,407 | A | * | 12/1899 | Wheeler | ................ | B62M 3/083 |
| | | | | | | 74/594.4 |
| 3,640,572 | A | * | 2/1972 | Doehler | .................. | B60R 21/02 |
| | | | | | | 297/488 |
| 4,458,910 | A | | 7/1984 | Stillwagon | | |
| 4,488,453 | A | | 12/1984 | Drugeon et al. | | |
| 4,665,767 | A | * | 5/1987 | Lassche | ................ | B62M 3/083 |
| | | | | | | 74/594.6 |
| 4,686,867 | A | | 8/1987 | Bernard et al. | | |

(Continued)

FOREIGN PATENT DOCUMENTS

CH          235694    *  4/1943
FR       2729633 A1  *  7/1996

(Continued)

OTHER PUBLICATIONS

United States Office Action, U.S. Appl. No. 16/011,130, dated Apr. 15, 2019, 12 pages.

(Continued)

*Primary Examiner* — Vinh Luong
(74) *Attorney, Agent, or Firm* — Fenwick & West LLP

(57) ABSTRACT

Embodiments relate to a pedal system having a cuff for retaining a foot or footwear at the pedal in a manner that supports different sizes and form factors of feet or footwear. The pedal system has a rod secured to a pedal in a rotatable manner and the cuff is coupled to the rod. A lever may be coupled to the rod in a manner where engagement of the lever by the user's foot or footwear affects the rod and thus, a position of the cuff relative to the user's foot or footwear. The lever and the cuff may retain the user's foot or footwear at the pedal in an engaged mode and release the user's foot or footwear from the top surface in a disengaged mode. The pedal system is switchable between the engaged mode and the disengaged mode.

7 Claims, 23 Drawing Sheets

(56) References Cited

U.S. PATENT DOCUMENTS

| | | | |
|---|---|---|---|
| 4,794,817 A | | 1/1989 | Romano |
| 4,819,504 A | | 4/1989 | Sampson |
| 4,856,365 A | | 8/1989 | Romano |
| 4,889,010 A | | 12/1989 | Ross |
| 4,898,064 A | * | 2/1990 | Romano ................ B62M 3/083 36/131 |
| 4,922,786 A | | 5/1990 | Romano |
| 4,969,373 A | | 11/1990 | Good |
| 5,078,026 A | * | 1/1992 | Giffin .................... B62M 3/083 74/594.4 |
| 5,456,138 A | | 10/1995 | Nutile et al. |
| 5,927,744 A | * | 7/1999 | Knapschafer .......... A63C 10/06 280/14.22 |
| 6,035,743 A | | 3/2000 | Gapinski et al. |
| 7,614,638 B2 | * | 11/2009 | Cunningham ......... A63C 10/06 280/11.31 |
| 10,214,264 B2 | * | 2/2019 | Davis .................... B62M 3/083 |
| 10,569,830 B2 | * | 2/2020 | Davis .................... B62M 3/086 |
| 10,668,978 B2 | * | 6/2020 | Davis .................... B62M 3/083 |
| 2006/0021262 A1 | * | 2/2006 | Killion ................. A43B 13/184 36/136 |
| 2006/0260434 A1 | | 11/2006 | Tseng |
| 2007/0255191 A1 | * | 11/2007 | Cozzo .................... A43B 5/14 602/23 |
| 2011/0048165 A1 | | 3/2011 | Lee |
| 2016/0151223 A1 | * | 6/2016 | Ferro ................... A61G 13/101 128/845 |
| 2016/0304156 A1 | * | 10/2016 | Pepito .................. B62M 3/086 |
| 2018/0281894 A1 | | 10/2018 | Davis et al. |
| 2019/0382078 A1 | * | 12/2019 | Davis ...................... B62M 3/08 |
| 2019/0384346 A1 | * | 12/2019 | Davis ...................... G05G 5/18 |

FOREIGN PATENT DOCUMENTS

| | | | |
|---|---|---|---|
| GB | 485748 | * 5/1938 | |
| WO | WO-97/12803 A1 | 4/1997 | |
| WO | WO 98/54047 A1 | 12/1998 | |
| WO | Wo 2017106336 | * 6/2017 | ............ B62M 3/083 |

OTHER PUBLICATIONS

PCT International Search Report and Written Opinion, PCT Application No. PCT/US2019/032042, dated Jul. 25, 2019, 13 pages.
PCT International Search Report and Written Opinion, PCT Application No. PCT/US18/38113, dated Sep. 17, 2018, 14 pages.

* cited by examiner

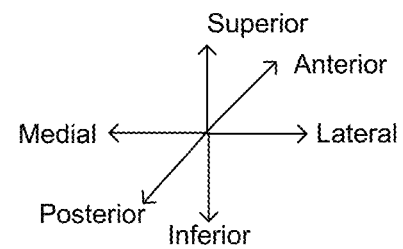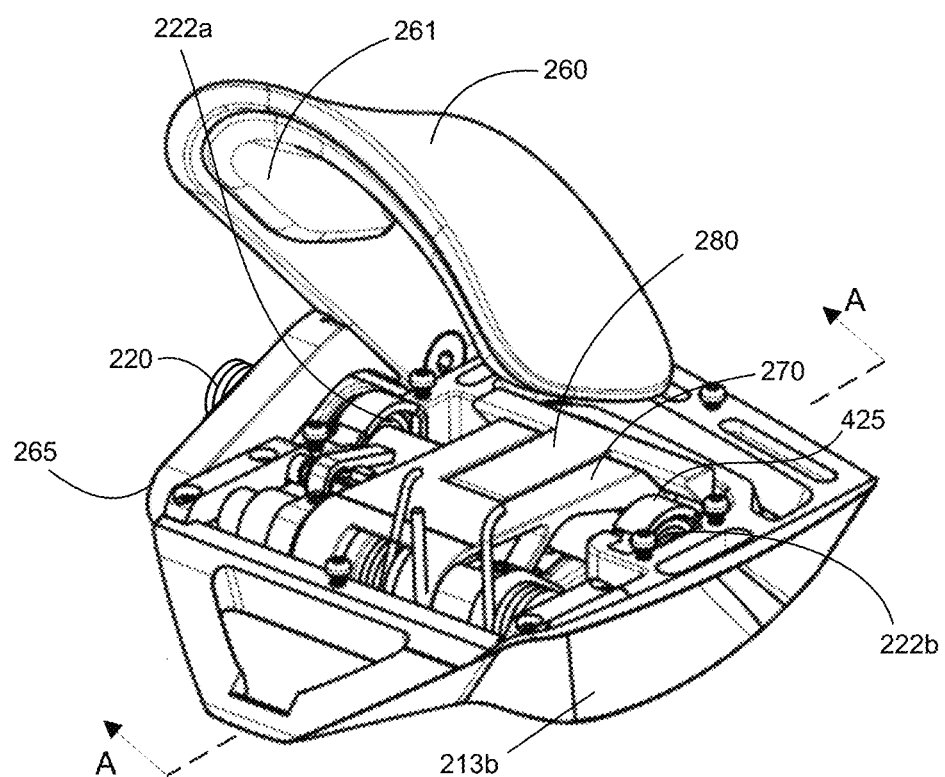
FIG. 2C

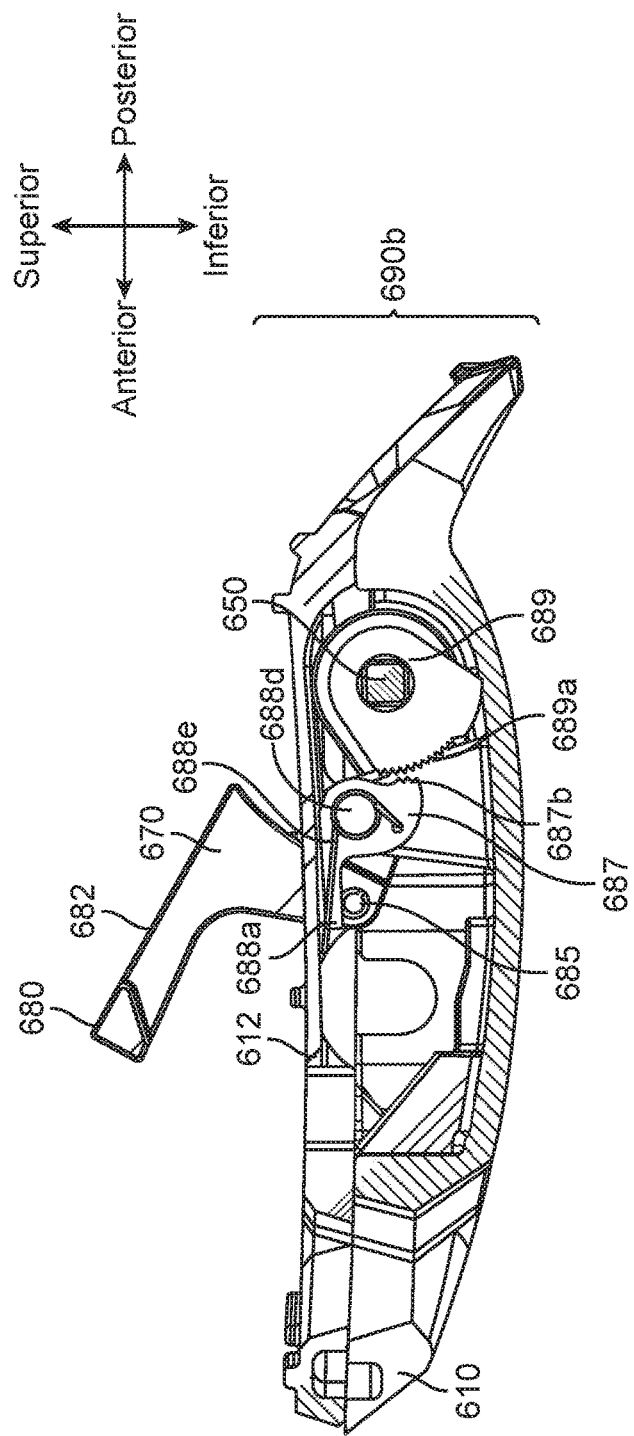
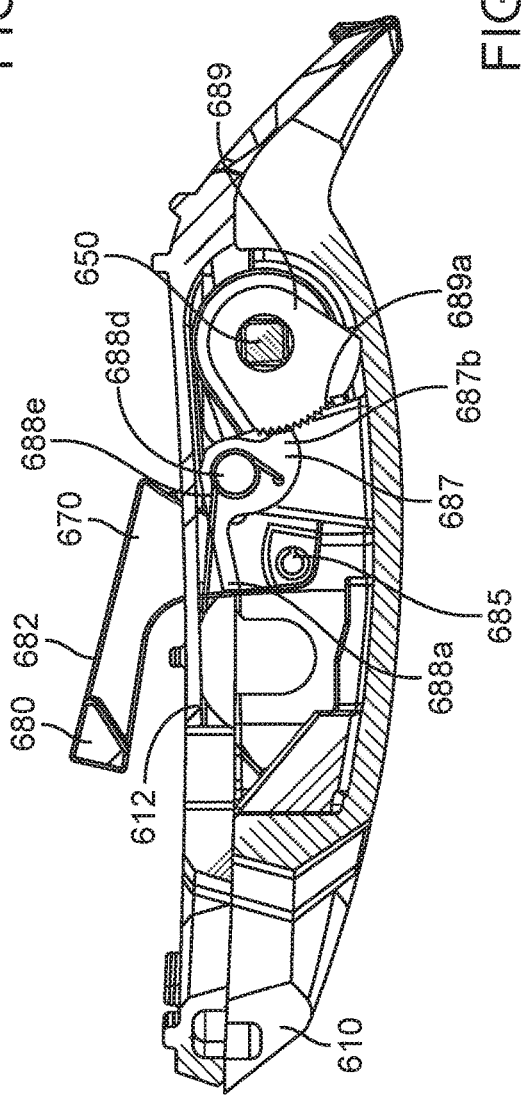
FIG. 6A
FIG. 6B

1000

```
┌─────────────────────────────────────────────────────────────┐
│ Responsive to engaging a main drive shaft of a pedal with a │
│ plunger, prevent rotation of the pedal relative to the main │
│                  drive shaft in a locked mode               │
│                             1010                            │
└─────────────────────────────────────────────────────────────┘
                              ↕
┌─────────────────────────────────────────────────────────────┐
│ Responsive to disengaging the main drive shaft from the     │
│ plunger, enable rotation of the pedal relative to the main  │
│                 drive shaft in a released mode              │
│                             1020                            │
└─────────────────────────────────────────────────────────────┘

┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
  Bypass the locked mode by allowing the main drive shaft to
│             be physically displaced from the plunger        │
                              1030
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

FIG. 10

PEDAL WITH CUFF LOCKING AND UNLOCKING MECHANISM

CROSS REFERENCE TO RELATED APPLICATIONS

This application is related to U.S. application Ser. No. 16/011,130, filed on Jun. 18, 2018 entitled "PEDAL WITH LOCKING AND UNLOCKING MECHANISM,", and which is incorporated herein by reference in its entirety for all purposes.

BACKGROUND

The present disclosure generally relates to foot pedals, and more particularly, to a foot pedal with cuff for engaging and retaining a user's foot or footwear while the user performs an activity.

Pedals, such as pedals on bicycles, exercise equipment, or transportation vehicles, function to support a user's feet while the user performs an activity. Some pedals can also, in combination with specialized footwear, function to retain a user's feet during performance of an activity, especially when the activity involves fine control of forces applied by the user's feet. Current pedals systems, however, are limited in many ways, such as requiring customized footwear, preventing a user from disengaging at critical moments, and/or lack mechanisms that facilitate engagement of the pedals by a user. Especially, failure to disengage at critical moments may lead to the user's injury.

SUMMARY

Embodiments relate to a pedal secured to a main drive and switchable between a locked mode where the pedal does not rotate relative to the main drive shaft and a released mode where the pedal rotates relative to the main drive shaft. The main drive shaft adjoins to a platform (e.g., a crank arm of a bicycle) or another system. When the user's foot or footwear is engaging the pedal, the pedal is placed in a released mode whereas when the user's foot or footwear is disengaged from the pedal, the pedal is placed in a locked mode.

In one or more embodiments, when placed in the locked mode, rotation of the pedal relative to the main drive shaft is prevented by a plunger that engages the main drive shaft. When placed in the released mode, rotation of the pedal relative to the main drive shaft is enabled by having the plunger disengage from the main drive shaft.

Embodiments also relate to a rod secured to the pedal in a rotatable manner and a cuff coupled to the rod to support retention of the user's foot or footwear in a manner that supports feet of different sizes and form factors. A lever may be coupled to the rod and exposed through the top surface of the pedal. The lever and the cuff may retain the user's foot or footwear at the top surface of the pedal in an engaged mode and release the user's foot or footwear from the top surface in a disengaged mode. The system can also include a trigger coupled to the rod where the trigger causes locking of a position of the cuff in the engaged mode and causes unlocking of the position of the cuff in the disengaged mode, thereby allowing the user to release his or her feet from the system in an efficient and intuitive manner. As such, one or more embodiments of a method implemented by the system can include transitioning a cuff to a foot retention mode upon engaging a rod coupled to the cuff, locking the cuff in the foot retention mode, and transitioning the cuff to a foot releasing mode upon unlocking the cuff and allowing the cuff to be released from the foot retention mode.

BRIEF DESCRIPTION OF THE DRAWINGS

FIG. 2C depicts a perspective view of the pedal system of FIG. 2A with a top plate removed, in accordance with one embodiment.

FIG. 6A depicts a cross sectional view of the pedal system of FIGS. 2A and 2B in a disengaged mode taken along plane 2-2, in accordance with one embodiment.

FIG. 6B depicts a cross sectional view of the pedal system of FIGS. 2A and 2B in a transitional state taken along plane 2-2, in accordance with one embodiment.

FIG. 10 is a flowchart illustrating a method changing pedal configuration, in accordance with one embodiment.

DETAILED DESCRIPTION

Figure 1A:
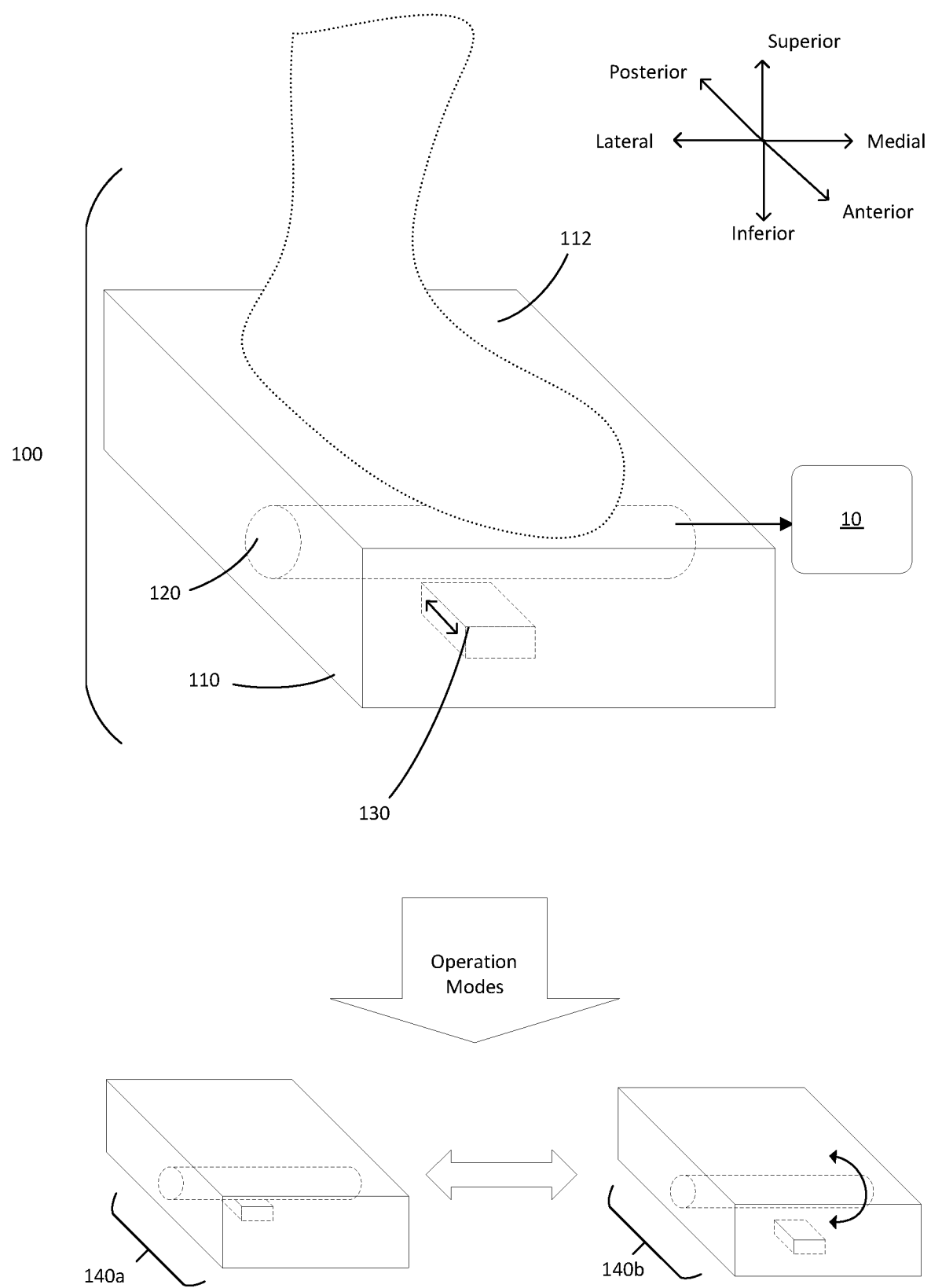
FIG. 1A is a schematic diagram illustrating operating components of a pedal system, in accordance with one embodiment.

Embodiments relate to a pedal system having a pedal coupled to a main drive shaft having a locked mode where the pedal does not rotate relative to the main drive shaft and a released mode where the pedal can rotate relative to the main drive shaft. When placed in the locked mode, rotation of the pedal relative to the main drive shaft can be prevented by a plunger that engages the main drive shaft. When placed in the released mode, rotation of the pedal relative to the main drive shaft can be enabled by having the plunger disengage from the main drive shaft. The pedal system is switchable between the locked and released modes in response to engagement by a user's foot or footwear. When a user's foot or footwear is engaging the pedal, the pedal is placed in the released mode, and when the user's foot or footwear is disengaged from the pedal, the pedal is placed in the locked mode. The pedal system thus allows the user to easily engage the pedal to perform an activity.

Embodiments relate to a pedal system having a cuff for retaining a foot or footwear at the pedal in a manner that supports different sizes and form factors of feet or footwear. The pedal system has a rod secured to a pedal in a rotatable manner and the cuff is coupled to the rod. A lever may be coupled to the rod in a manner where engagement of the lever by the user's foot or footwear affects the rod and thus, a position of the cuff relative to the user's foot or footwear. The lever and the cuff may retain the user's foot or footwear at the pedal in an engaged mode and release the user's foot or footwear from the top surface in a disengaged mode. The pedal system is switchable between the engaged mode and the disengaged mode.

The pedal system may also include a trigger that causes locking of a position of the cuff in the engaged mode and causes unlocking of the position of the cuff in the disengaged mode, thereby allowing the user to release his or her feet from the system in an efficient and intuitive manner. As such, one or more embodiments of a method implemented by the system can include transitioning a cuff to a foot retention mode upon engaging a rod coupled to the cuff, locking the cuff in the foot retention mode, and transitioning the cuff to a foot releasing mode upon unlocking the cuff and allowing the cuff to be released from the foot retention mode.

Embodiments of the pedal system(s) described herein can function to support a user's feet while the user performs an activity associated with applications involving rotational movement such as with bicycles, or non-rotational (static) activity such as with certain types of exercise equipment (like rowing machines), or transportation vehicles. Embodiments of systems and methods described herein can additionally or alternatively function to, without customized footwear, retain a user's feet during performance of an activity, especially when the activity involves fine control of forces applied by the user's feet. Embodiments of systems and methods described herein can additionally or alternatively allow a user to disengage such systems during critical moments, thereby preventing injury, and/or provide mechanisms that facilitate engagement of the pedals by a user.

FIG. 1A is a schematic diagram illustrating operating components of a pedal system 100, in accordance with one embodiment. The pedal system 100 may include, among other components, a pedal 110 having a top surface 112 that comes in contact with footwear (e.g., a sole region of footwear of a user), a main drive shaft 120 secured to the pedal in a rotatable manner, a plunger 130. The pedal 110 functions to support a user's foot and/or footwear as the user performs an activity associated with equipment or systems coupled to the pedal.

The pedal 110 can have top, bottom, and/or side surfaces, as described in relation to variations and examples in further detail below with reference to FIGS. 2A-2E. In particular, the pedal 110 can have a top surface 112 that receives and facilitates positioning of a foot or footwear of the user during operation. For example, the top surface 112 can have a surface morphology including recessed and/or protruding regions that complement a user's footwear morphology and/or a user's foot anatomy. The top surface 112 can additionally or alternatively include one or more openings associated with elements that promote engagement of the pedal system by a user and/or that enable operation modes associated with elements described in more detail below with reference to FIGS. 2A, 2D, 2E, 3A-3C, and 6A-6C.

In relation to supporting a user's footwear or foot, the top surface 112 can be a substantially planar surface, or can alternatively be defined by one or more splines (e.g., functions defined piecewise by polynomials and used for interpolating between points). As such, recessed and/or protruding aspects of the top surface 112 can be customized to a specific user's needs. The top surface 112 can additionally or alternatively include other suitable non-planar features. The top surface 112 can additionally or alternatively include non-curved features (e.g., edges, corners, etc.) associated with mounting or coupling to other system components.

The pedal 110 can additionally or alternatively have an internal cavity that contains and/or retains positions of other elements of the pedal system 100 with suitable degrees of freedom of rotation and/or translation. However, the pedal 110 can alternatively omit an internal cavity and provide a bulk substrate that supports other elements of the system 100 in any other suitable manner. As such, internal and/or external features of the pedal 110 can provide support to the user's footwear, foot, and/or other elements of the system 100.

In material composition, the pedal 110 can be composed of material having mechanical properties suitable for structurally supporting other elements and/or forces applied by the user's foot during performance of an activity. As such, the pedal 110 can have a tensile strength, a compressive strength, a shear strength, an elastic modulus, a hardness, a derivative of the above mechanical properties and/or other properties that enable structural support of other elements and resistance to deformation, in association with feature dimensions and operation modes described below. In variations, the pedal 110 can be composed of a metal (e.g., aluminum-based material, steel-based material, titaniumbased material, etc.), polymer (e.g., high molecular weight polymer, etc.), or any other suitable material. Surface features of the pedal 110 can additionally or alternatively be treated, coupled to, or otherwise coated with materials that provide surface functionality. For instance, portions of the pedal 110 can be coated with a material (e.g., Teflon) that reduces friction in association with user engagement with or disengagement from the system, or portions of the pedal 110 can be coupled to a material that increases friction in association with retention of a position of footwear or a foot of a user at the pedal during use.

The main drive shaft 120, as shown in FIG. 1A, couples the pedal 110 to sports equipment (e.g., the crank arm of a bicycle or exercise bike) or components of a transportation system (e.g., motorcycle, moped, etc.). The main drive shaft 120 can also define a pitch axis of rotation about which the pedal 110 can rotate while the user performs an activity. As such, the main drive shaft 120 can be retained in position relative to the pedal 110 with a rotational degree of freedom about the pitch axis (e.g., by way of bearings, etc.). In one or more embodiments, the main drive shaft 120 can be retained within an internal cavity of the pedal 110, or can be coupled to any other suitable surface of the pedal 110.

In material composition, the main drive shaft 120 is can be composed of a material that is robust against bending stresses, torsional stresses, shear stresses, and fatigue (e.g., from cyclic loading) in relation to an activity performed by a user when interfacing with the system 100. However, the main drive shaft 120 can additionally be composed of a material robust against compressive and/or tensile stresses, or wear induced by engaging other elements of the system in the locked mode 140a and/or the released mode 140b, described in FIG. 1A and below with reference to FIGS. 3A-3C. The main drive shaft 120 can also be coated with, treated with, or include a material that reduces friction or wear (e.g., graphite, Teflon, polyethylene, lubricant, etc.) associated with motion of other elements in communication with the main drive shaft 120 during operation. In alternative embodiments, the main drive shaft 120 is composed of a metallic material (e.g., steel material) or other suitable material.

In coordination with operation of the plunger 130 described below with reference to FIG. 1A, the main drive shaft 110 can have one or more active regions that engage the plunger 130 in the locked mode 140a and disengage the plunger 130 in the released mode 140b. The active regions can be regions having morphological features and/or physically active features (e.g., magnetic features) that can be engaged to transition between physical modes.

The plunger 130 functions to move between an engaging position and a disengaging position relative to one or more regions of the main drive shaft 120 in order to transitioning between the locked mode 140a and the released mode 140b of the system 100. That is, the plunger 130 can thus transition between the engaging position, in which the plunger 130 interfaces with the main drive shaft 120 (e.g., at an active region of the main drive shaft 120), and the disengaging position, in which the plunger 130 is displaced away from the main drive shaft 120 (e.g., away from an active region of the main drive shaft 120). In relation to transitioning between positions, motion(s) of the plunger (e.g., in translation and/or rotation) can thus be constrained by one or more guides coupled to the pedal 110 and/or to the plunger 130, where an embodiment of a plunger guide is described in relation to FIGS. 2D and 2E. Furthermore, in relation to positions of the plunger 130 relative to the main drive shaft 120, the plunger 130 can include or otherwise be coupled to biasing elements (e.g., cam surfaces, springs under tension or compression, elastomeric elements under tension or compression, magnetic elements, etc.) that drive motion of the plunger 130 toward a desired state, or restore a position of the plunger 130 to a desired state. Additionally or alternatively, the plunger 130 is coupled to an actuator (e.g., linear actuator with or without an encoder) that enables positioning of the plunger 130 relative to the main drive shaft 120.

The plunger 130 may be located proximal to the main drive shaft 120 so that the plunger 130 can thus be retained within an internal cavity of the pedal 110. The plunger 130 may also be positioned at any other suitable surface of the pedal 100 that allows the plunger 130 to engage the main drive shaft 120 during operation.

In material composition, the plunger 130 may be composed of a material that is robust against shear stresses and compressive stresses in relation to an activity performed by a user when interfacing with the system 100. However, the plunger 130 can additionally be composed of a material robust against compressive and/or tensile stresses, or wear induced by engaging other elements of the system in the locked mode 140a and/or the released mode 140b, described below with reference to FIG. 1A The plunger 130 can also be coated with, treated with, or include a material that reduces friction or wear (e.g., graphite, Teflon, polyethylene, lubricant, etc.) associated with motion of other elements in communication with the plunger 130 during operation. In some embodiments, the plunger 130 is composed of a metallic material (e.g., steel material) or other suitable material.

In the locked mode 140a, a position of the pedal 110 is retained relative to the main drive shaft 120. The pedal 110 is placed in the locked mode 140 when a user initially engages the pedal 110 for performing an activity. In more detail, by placing the pedal 110 in the locked mode 140a, a stable surface (e.g., non-rotating surface) is provided by the pedal 110 so that the user can engage (e.g., step into) the pedal 110 prior to performing an activity. The pedal 110 is prevented from entering the locked mode 140a while the main drive shaft 120 is spinning (e.g., while the user is riding), such that the main drive shaft 120 cannot spin itself out of a connection with any associated equipment 10.

In the locked mode 140a, as shown in FIG. 1A, the plunger 130 engages the main drive shaft 120 to prevent rotation of the pedal relative to the main drive shaft. As such, in the locked mode 140a, transitioning of a region of the plunger 130 toward an active region of the main drive shaft 120 causes the plunger 130 to physically obstruct the main drive shaft 120 by providing a physical obstacle to rotational motion of the pedal 110 relative to the main drive shaft 120. Alternatively, in the locked mode 140a, a component of the plunger 130 can otherwise provide a force (e.g., magnetic force) that interacts with an active region of the main drive shaft 120 to prevent rotational motion of the pedal 110 relative to the main drive shaft 120.

In the released mode 140b, rotational motion of the pedal 110 relative to the main drive shaft 120 is allowed in a manner that a user is accustomed to while performing the activity. In the released mode 140b, as shown in FIG. 1A, the plunger 130 disengages the main drive shaft 120 to enable the pedal to rotate relative to the main drive shaft 120. As such, in the released mode 140b, transitioning of a region of the plunger 130 away from an active region of the main drive shaft 120 can appropriately remove a physical obstacle to rotational motion of the pedal 110 relative to the main drive shaft 120. Alternatively, in the released mode 140b, a component of the plunger 130 can otherwise remove or provide a force (e.g., interference or magnetic force) that interacts with an active region of the main drive shaft 120 to enable rotational motion of the pedal 110 relative to the main drive shaft 120.

Figure 1B:
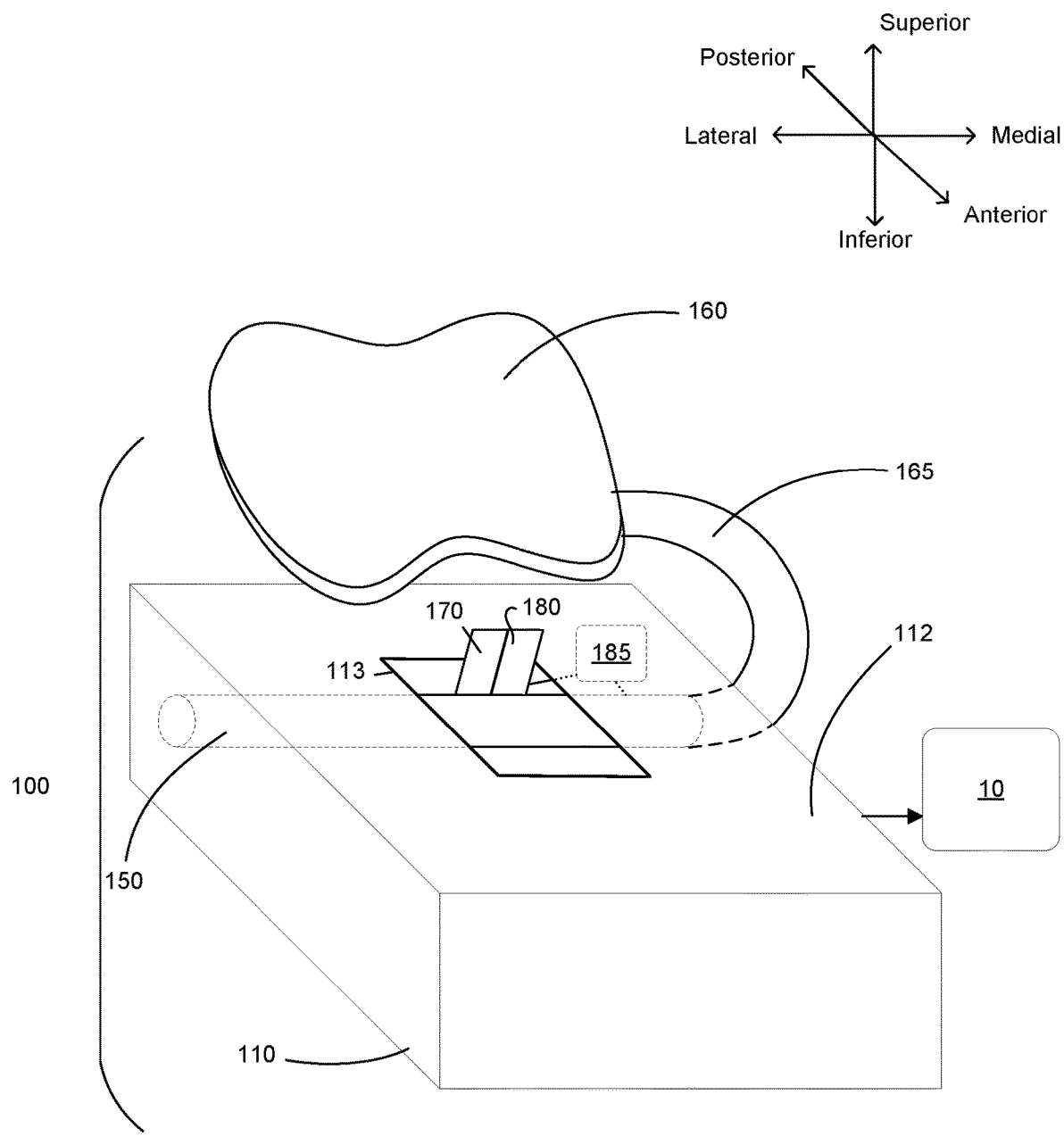
FIG. 1B is a schematic diagram illustrating a pedal system with a cuff, in accordance with one embodiment.

FIG. 1B is a schematic diagram illustrating a pedal system 100 with a cuff 160, in accordance with one embodiment. The pedal system 100 can additionally or alternatively include a rod 150 secured to the pedal 110 in a rotatable manner and the cuff 160 coupled to the rod 150. The cuff 160 supports retention of the foot or footwear of the user at the pedal 110 in a manner that is appropriate for different sizes and form factors of feet/footwear. The system 100 can also include a lever 170 coupled to the rod 150 and also exposed through the top surface 112 of the pedal 110. The lever 170, with the cuff 160, retains footwear at the top surface 112 of the pedal 110 in an engaged mode 190a and releases footwear from the top surface 112 in a disengaged mode 190b. The pedal system 100 can also include a trigger 180 interfacing with the rod 150 by a locking subsystem 185 having or corresponding to a lock and that causes locking of a position of the cuff 160 in the engaged mode 190a and to cause unlocking of the position of the cuff 160 in the disengaged mode 190b, thereby allowing the user to release his or her feet from the system in an efficient and intuitive manner.

The rod 150 functions to support other elements associated with the engaged mode 190a and the disengaged mode 190b, including the cuff 160, the lever 170, the trigger 180, and at least a portion of the locking subsystem 185. The rod 150 can also define an axis of rotation (e.g., an axis different from the pitch axis defined by the main drive shaft 120, an axis parallel to the pitch axis defined by the main drive shaft 120, etc.) about which one or more elements associated with the rod 150 can rotate in relation to transitioning between the engaged mode 190a and the disengaged mode 190b. As such, the rod 150 can be retained in position relative to the pedal 110 with a rotational degree of freedom about the axis (e.g., by way of bearings, etc.). In embodiments described below herein, the rod 150 can be retained within an internal cavity of the pedal 110 and displaced longitudinally from the main drive shaft 120 in order to prevent interference with rotation of the main drive shaft 120 during at least some modes of the system 100, or can alternatively be coupled to any other suitable surface of the pedal 110.

In material composition, the rod 150 can be composed of a material that is robust against bending stresses, torsional stresses, and shear stresses in relation to forces incurred within the rod 150 while a user interfaces with the system 100. However, the rod 150 can additionally be composed of a material robust against compressive and/or tensile stresses, or wear induced by engaging other elements of the system in the engaged mode 190a and/or the disengaged mode 190b, described below with reference to FIG. 1C. The rod can also be coated with, treated with, or include a material that reduces friction or wear (e.g., graphite, Teflon, polyethylene, lubricant, etc.) associated with motion of other elements in communication with the rod 150 during operation. In variations, the rod 190 can be composed of a metallic material (e.g., steel material) or other suitable material.

The cuff 160 functions to retain a user's foot or footwear at the pedal 110 in the engaged mode 190a and to enable release of the user's foot or footwear from the pedal 110 in the disengaged mode 190b. The cuff 160 can also function to robustly support the user's foot or footwear at the pedal 110 (e.g., with a compressive force provided by the cuff 160 and the pedal 110). As such, the cuff 160 can be composed of a material that has sufficient mechanical properties to reliably and repeatedly retain the user's foot or footwear at the pedal 110 over multiple uses of the pedal 110 and during cyclic loads applied to the cuff 160 and the pedal 110 during use. In material composition, the cuff 160 can be composed of a material that is robust against bending stresses, shear stresses, compressive stresses, tensile stresses, and fatigue, in relation to forces incurred at the cuff 160 while a user interfaces with the system 100. The cuff 160 can be composed of a polymeric material (e.g., plastic), metallic material, and/or another suitable material.

The cuff 160 can also function to provide comfort to the user as the user performs an activity, by inclusion of soft, resilient, and/or otherwise compliant materials that interface with the user's foot or footwear during operation of the system 100 in the engaged mode 190a. As such, portions of the cuff (e.g., portions of the cuff 160 facing the foot or footwear of the user) can be composed of a foam material, fabric material, polymer material, or any other suitable material. In one such variation, the cuff 160 can include a mechanically robust polymer base material, and be coupled to a compliant foam material at regions interfacing with the foot or footwear of the user.

In morphology, the cuff 160 can have a concave surface facing the user's foot or footwear, such that the concave surface is complementary to the shape of the foot or footwear of the user. The cuff 160 can, however, have any other suitable surface feature(s) that facilitate retention of the user's foot or footwear at the pedal 110 in a comfortable manner. For instance, the cuff 160 can have a closed medial side and an open lateral side that allows the user to rapidly and easily disengage the system 100 during critical moments. The cuff 160 can also have open anterior and posterior sides. The morphology of the cuff 160 may be appropriate to accommodate variations in user foot morphology (e.g., in terms of shoe size, in terms of width, etc.). In the engaged mode 190a described below with reference to FIG. 1C, the cuff 160 can span a cuneiform region of the user's foot; however, in other variations, the cuff 160 can additionally or alternatively include portions that span a metatarsal region or phalange region of the user's foot to provide adequate support to the user during performance of an activity.

The cuff 160 may be coupled to the rod 150, such that a force applied to the lever 170 described below with reference to FIG. 1B rotates the rod 150 and allows the cuff 160 to comfortably compress (e.g., with a desired amount of force) the user's foot or footwear between the top surface 112 of the pedal 110 and the cuff 160. Coupling between the cuff 160 and the rod 150 can be at a region of the rod outside of the body of the pedal 110 (e.g., at a portion of the rod 150 extending through a medial side wall of the pedal 110 and exterior to the pedal 110). Coupling between the cuff 160 and the rod 150 can alternatively be at a region of the rod 150 within the body of the pedal 110. As shown in FIG. 1B, the cuff 160 can be coupled to the rod 150 by an arm 165 coupled to a portion of the rod 150 extending through a medial side wall of the pedal 110 and exterior to the pedal 110, where the arm 165 transforms rotation of the rod 150 induced by the lever 170 into motion of the cuff along an inferior-superior direction, thereby retaining and releasing the foot of the user during different modes of operation.

The lever 170 functions to repeatedly and reversibly transition the cuff 160 between a configuration that retains the foot of the user and a configuration that releases the foot of the user, in association with the engaged mode 190a and the disengaged mode 190b. As shown in FIG. 1B, the lever 170 is coupled to the rod 150 and also exposed through the top surface 112 of the pedal 110 through an opening 113. The lever 170 thus may include a first lever region that is coupled to the rod (e.g., a portion of the rod within an internal cavity of the pedal 110), such that motion of the lever is coupled with rotation of the rod; however, the first lever region can alternatively be coupled to any other suitable portion of the rod. The lever 170 can also include a second lever region exposed through the opening 113, whereby the user can engage the second lever region, thereby inducing motion of the rod 150 in association with transitioning the system 110 between the engaged mode 190a and the disengaged mode 190b.

In morphology, the lever 170 can have a surface that contacts the foot or footwear of the user during the transition between the engaged mode 190a and the disengaged mode 190b, where the surface protrudes from the opening 113 in transitioning between the engaged mode 190a to the disengaged mode 190b, but is substantially flush with the opening in the engaged mode 190. As such, the user's foot can slide over and/or apply a torsional force to the rod 150 by way of the lever 170, in order to promote transitioning from the disengaged mode 190b to the engaged mode 190a of the system 100. The lever 170 can, however, have other morphologies, as shown and described below.

In material composition, the lever 170 can be composed of a material that is robust against torsional stresses, compressive stresses, and fatigue in relation to forces applied by the user's foot to the lever. The lever can additionally be composed of a material robust against other types of stresses. One or more surfaces of the lever 170 can also be coated with, treated with, or include a material that reduces friction or wear (e.g., graphite, Teflon, polyethylene, lubricant, etc.) associated with interfaces with the user's foot during operation. In variations, the lever 170 can be composed of a metallic material (e.g., steel material) or other suitable material.

The trigger 180 functions to cause locking of a position of the cuff 160 in the engaged mode 190a and to cause unlocking of the position of the cuff 160 in the disengaged mode 190b, thereby allowing the user to release his or her feet from the system in an efficient and intuitive manner and prevent trapping of the user's foot at the pedal when the user wishes to disengage the system 100. As shown in FIG. 1B, the trigger 180 is coupled to the rod 150 and also exposed through the top surface 112 of the pedal 110 through an opening 113. The trigger may thus include a first trigger region that is coupled to the rod (e.g., a portion of the rod within an internal cavity of the pedal 110); however, the first trigger region can alternatively be coupled to any other suitable portion of the rod 150. The trigger 180 can also include a second trigger region exposed through the opening 113, whereby the user can engage the second trigger region, in order to cause locking of the cuff 160 in position in the engaged mode 190a and/or to cause unlocking of the cuff 160 in the released mode 190b.

The first trigger region can be coupled to the rod 150, but capable of rotating independently about the rod 150, where additional examples of configurations between the first trigger region and the rod 150 are described in more detail below with reference to FIGS. 2D-2E and 3A-3C. The first trigger region can also include or be associated with another portion of the trigger 180 that interfaces with a locking subsystem 185, where the locking subsystem 185 promotes locking of a position of the rod 150, arm 165, or cuff 160 in the engaged mode 190a and rapidly releases locking of a position of the rod 150, arm 165, or cuff 160 in the disengaged mode 190b. An example of the locking subsystem 185 is described in more detail below with reference to FIGS. 6A-6C and 7A7B.

In morphology, the trigger 180 can have a surface that contacts the foot or footwear of the user during the transition between the engaged mode 190a and the disengaged mode 190b, where the surface protrudes from the opening 113 in transitioning between the engaged mode 190a to the disengaged mode 190b, but is substantially flush with the opening in the engaged mode 190. As such, the user's foot can slide over and/or apply a torsional force to the trigger 180 in order to promote locking of the cuff 160 in the engaged mode 190a and/or slide away from the trigger 180 to quickly release locking of the cuff 160 in the disengaged mode 190b of the system. The trigger 180 can, however, have other morphologies, as shown and described below.

Motion of the trigger 180 can be coupled with motion of the lever 170 in transitioning from the disengaged mode 190b to the engaged mode 190a, such that the cuff 160 is simultaneously moved into position by the lever 170 and caused to lock in position by the trigger 180 as the user initiates performance of the activity involving the pedal 110. Motion of the trigger 180 can also be uncoupled with motion of the lever 170 in transitioning from the engaged mode 190a to the disengaged mode 190b, such that the position of the cuff 160 can be rapidly unlocked by the trigger 180 prior to release of the lever 170 and cuff 160 as the user attempts release from the system 100.

In material composition, the trigger 180 can be composed of a material that is robust against torsional stresses, compressive stresses, and fatigue in relation to forces applied by the user's foot to the trigger. However, the trigger 180 can additionally be composed of a material robust against other types of stresses. One or more surfaces of the trigger 180 can also be coated with, treated with, or include a material that reduces friction or wear (e.g., graphite, Teflon, polyethylene, lubricant, etc.) associated with interfaces with the user's foot during operation. In some embodiments, the trigger 180 can be composed of a metallic material (e.g., steel material) or other suitable material.

Figure 1C:
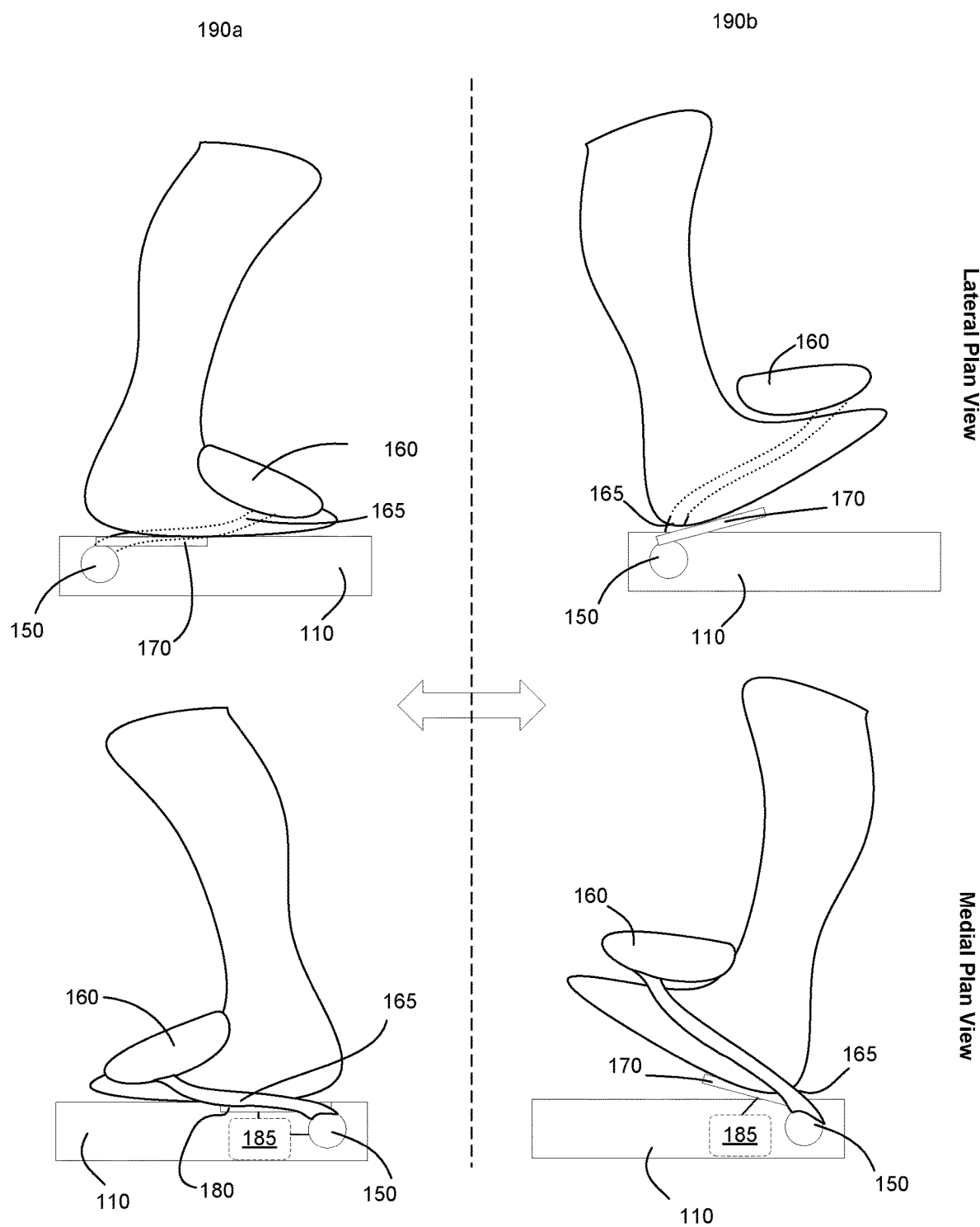
FIG. 1C depicts operation modes of the pedal system shown in FIGS. 1A and 1B, in accordance with one embodiment.

FIG. 1C depicts operation modes of the pedal system shown in FIGS. 1A and 1B, in accordance with one embodiment, and in particular, depicts an embodiment of the pedal system 100 in an engaged mode 190a and a disengaged mode 190b.

In the engaged mode 190a, the user's foot is retained in position at the pedal 110 with a desired level of force, such that the user can adequately perform the activity associated with the pedal 110. In the engaged mode 190a, as shown in FIG. 1C (top left, lateral plan view), the user's foot applies a torsional force to the rod 150 through the lever 170, thereby rotating the cuff 160 (due to coupling of the lever 170 to the rod 150 and the cuff 160 to the rod 150 by arm 165) and positioning the foot between the pedal 110 and the cuff 160. In the engaged mode 190a, as shown in FIG. 1C (bottom left, medial plan view), the locking subsystem 185 is also engaged, such that the cuff 160 is substantially locked in position by engagement of trigger 180 by the foot of the user.

In the disengaged mode 190b, the user's foot is released from the pedal 110, such that the user can rapidly disengage the pedal 110 when desired. In the disengaged mode 190b, as shown in FIG. 1C (top right, lateral plan view), the user's foot releases (or otherwise eliminates) a torsional force applied to the rod 150 through the lever 170, thereby rotating the cuff 160 (due to coupling of the lever 170 to the rod 150 and the cuff 160 to the rod 150 by arm 165) and allowing the foot to be released from the pedal 110. In the disengaged mode 190b, as shown in FIG. 1C (bottom right, medial plan view), the locking subsystem 185 is also disengaged by rotation of the trigger 180, such that the cuff 160 is substantially unlocked from a position that would retain the foot of the user.

In relation positions of elements of the system involved in transitioning between the engaged mode 190a and the disengaged mode 190b, elements can include or otherwise be coupled to biasing elements (e.g., torsional springs under tension or compression, cam surfaces, linear springs under tension or compression, elastomeric elements under tension or compression, magnetic elements, etc.) that drive motion of the cuff 160 or locking subsystem 185 toward a desired state, or restore a position of the cuff 160 or locking subsystem 185 to a desired state. Variations of systems including springs for restoring the system 100 to a disengaged mode 190b are described below with reference to FIGS. 2A-2E and 3A-3C. Additionally or alternatively, one or more elements can be coupled to an actuator (e.g., linear actuator with or without an encoder) that enables positioning of elements relative to the rod 150 in any other suitable manner.

Figure 2A:
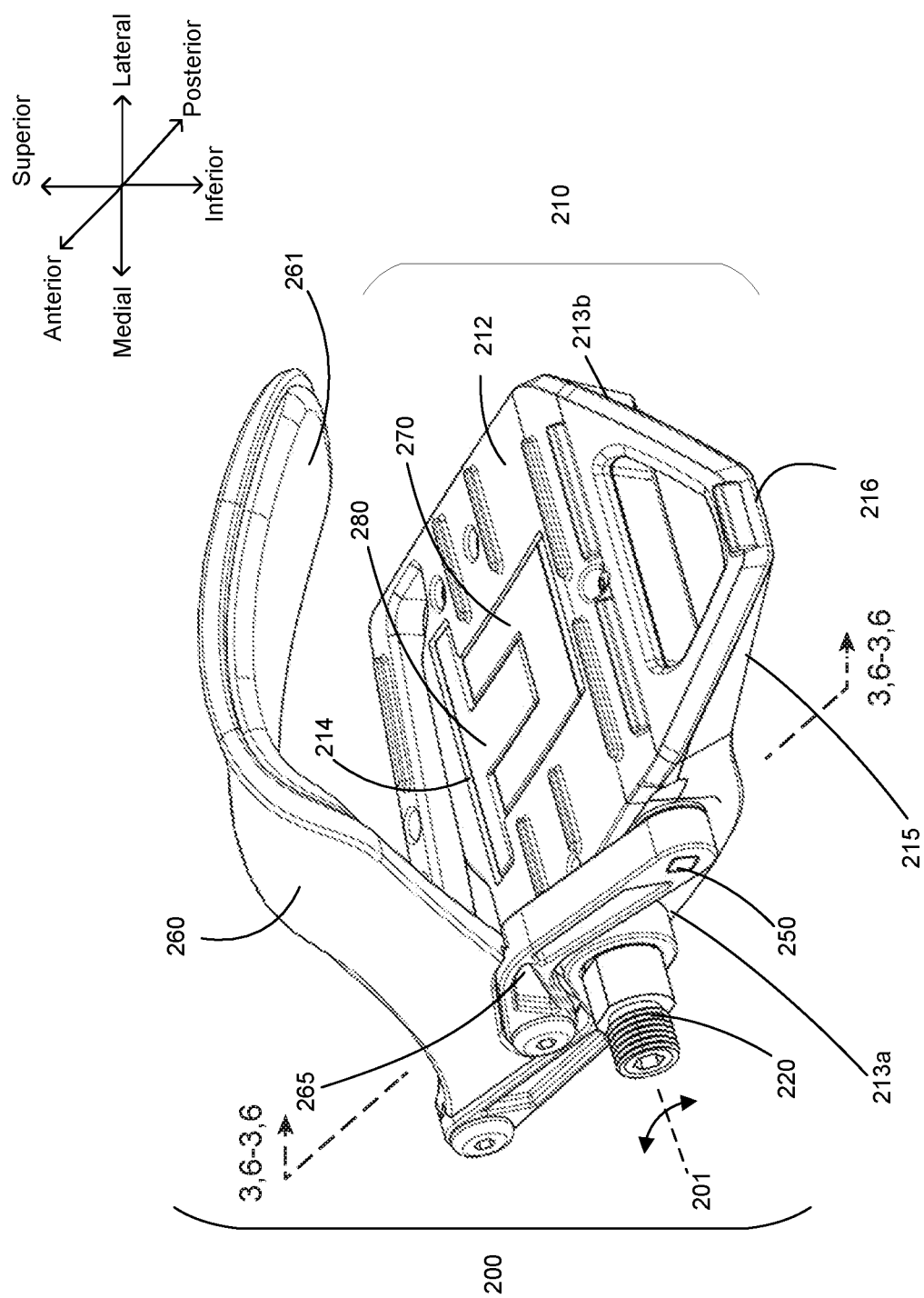
FIG. 2A depicts a perspective view of a pedal system, in accordance with one embodiment.
Figure 2B:
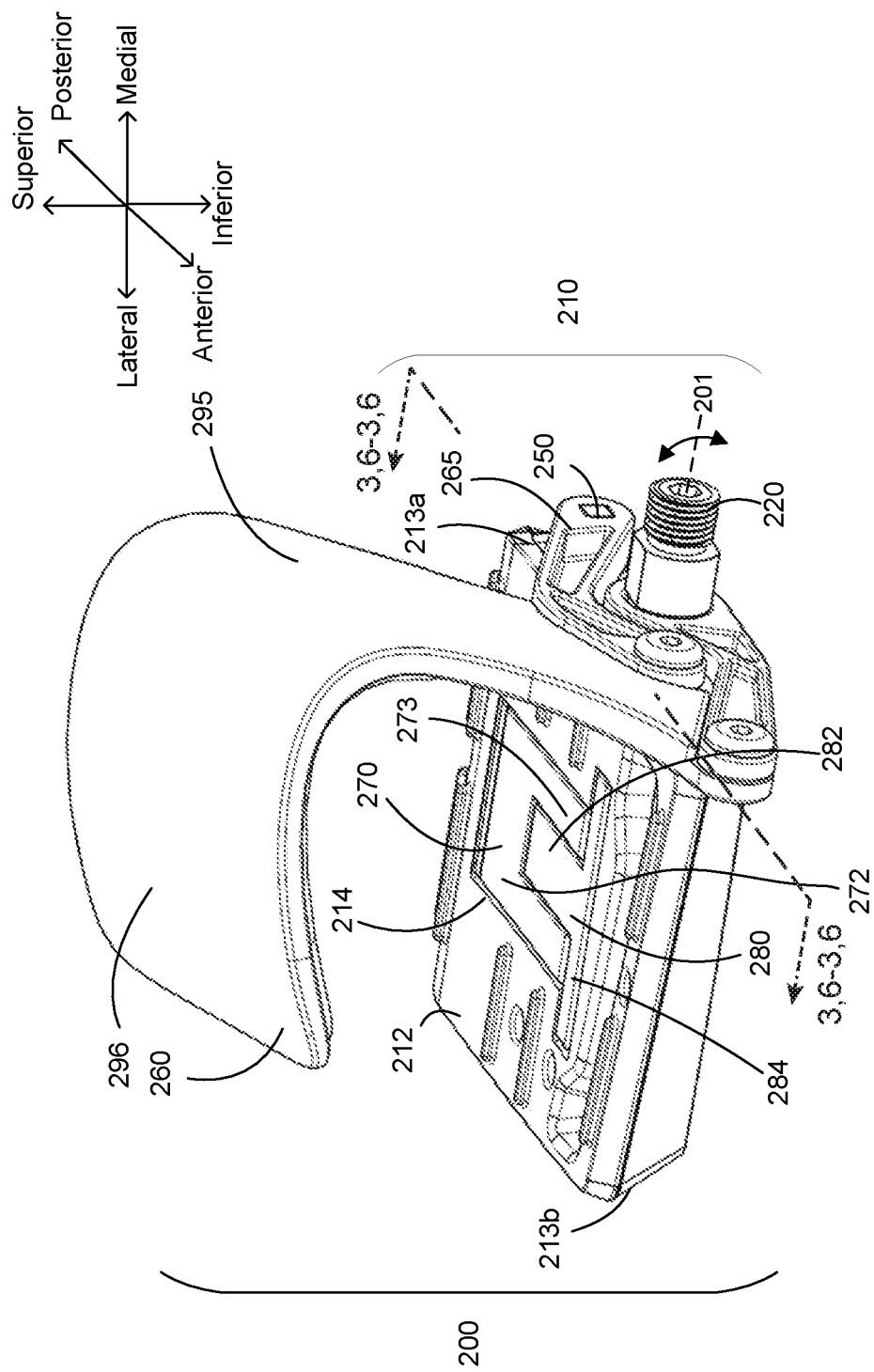
FIG. 2B depicts another perspective view of the pedal system shown in FIG. 2A, in accordance with one embodiment.
Figure 2D:
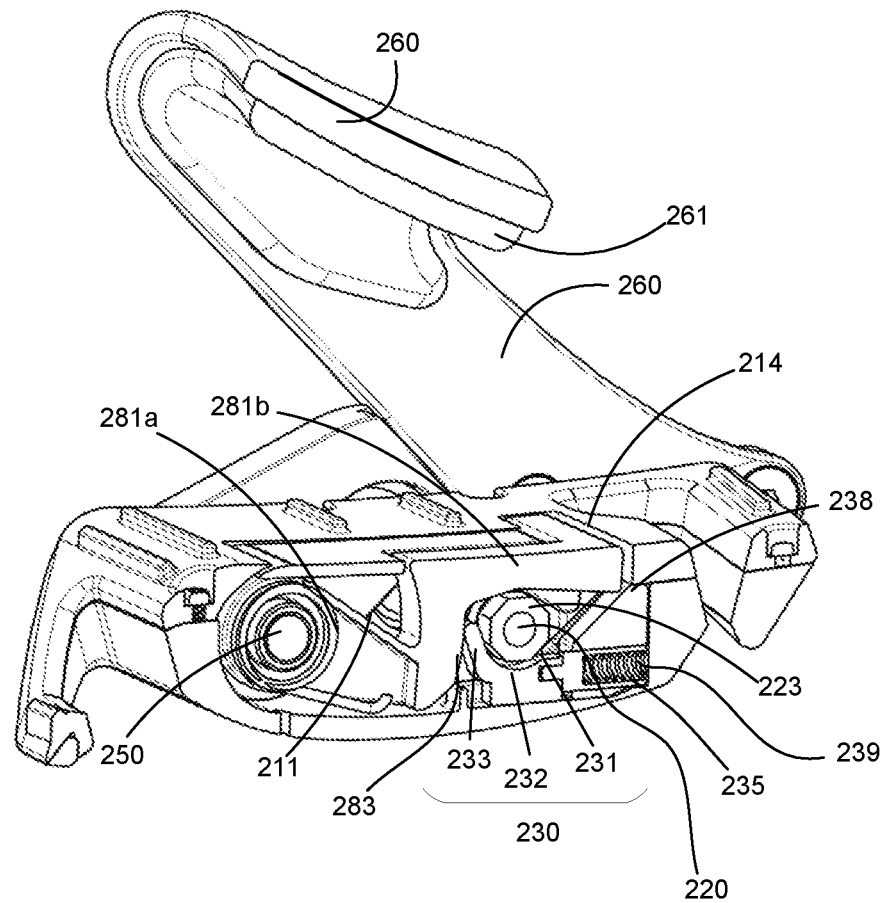
FIG. 2D is a perspective view of the pedal system of FIG. 2A cut along plane A, in accordance with one embodiment.
Figure 2E:
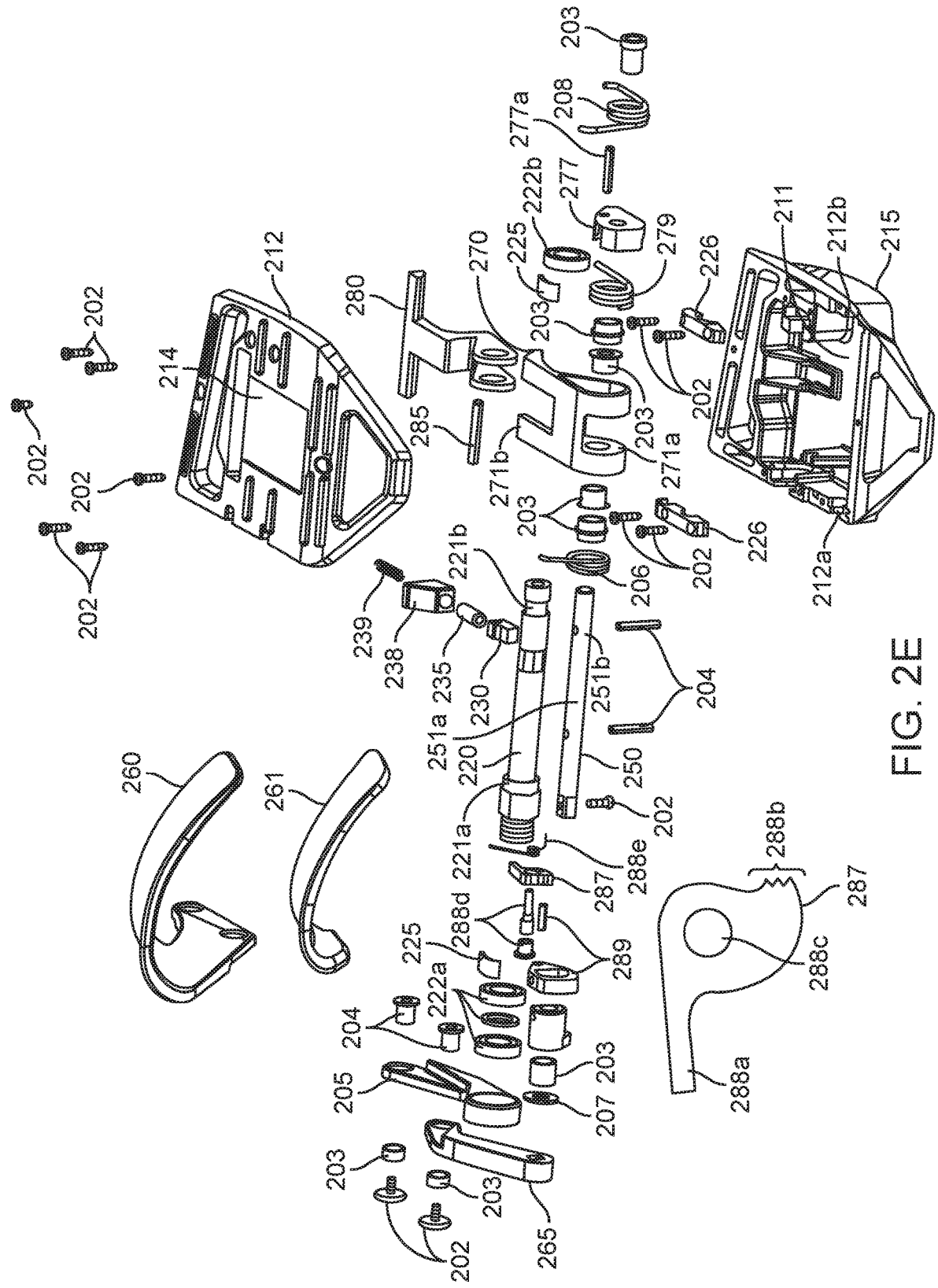
FIG. 2E is an exploded view of the pedal system of FIG. 2A, in accordance with one embodiment.

FIG. 2A depicts a perspective view of a pedal system, in accordance with one embodiment. FIG. 2B depicts another perspective view of the pedal system shown in FIG. 2A, in accordance with one embodiment. FIG. 2C depicts a perspective view of the pedal system of FIG. 2A with a top plate removed, in accordance with one embodiment. FIG. 2D is a perspective view of the pedal system of FIG. 2A cut along plane A-A, in accordance with one embodiment. FIG. 2E is an exploded view of the pedal system of FIG. 2A, in accordance with one embodiment.

The pedal system 200 shown in FIGS. 2A-2E includes a pedal 210 having an internal cavity 211 bounded by a top plate 212 and a pair of side walls (including side walls 213a and 213b extending from the top plate 212). The top plate 212 shown in FIGS. 2A-2E also includes an opening 214. Elements of the pedal system 200 interacting with the user and transitioning between modes of the pedal system 200 as a result of such interactions pass through the opening 214. In the embodiment shown in FIGS. 2A-2E, the top plate 212 of the pedal 210 is composed of an aluminum material (e.g., Aluminum-6061-T6) in relation to providing sufficient mechanical properties and overall weight of the system; however, other embodiments of the top plate 212 can alternatively be composed of any other suitable material.

The pedal 210 can also have a bottom case 215 that supports internal elements contained within the internal cavity 211. The bottom case 215 includes a triangular-shaped tab 216 extending from a posterior region of the bottom case 215 that facilitates transitioning of the pedal 210 to an "upright" configuration and/or positioning of the pedal 210 for receiving a user's foot. The triangular-shaped tab 216 and/or any other portion of the bottom case 215 can include material regions that grip the foot or footwear of the user to further support retention of the foot of the user at the pedal 210 in the engaged mode of the system; however, other embodiments of the bottom case 215 can alternatively omit the triangular-shaped tab and/or material regions for gripping. The main material of the bottom case 215 shown in FIGS. 2A-2E is composed of a nylon-based material (e.g., Nylon 66, Nylatron, etc.) having desired wear properties, self-lubricating properties, and/or other properties; however, alternative variations of the bottom case 215 can alternatively be composed of any other suitable material.

The top plate 212 can be coupled to the bottom case 215 at peripheral regions of the plates 212 and 215 (e.g., using fasteners, using a thermal bonding process, using an adhesive bonding process). The inferior portions of the top plate 212 and superior portions of the bottom case 215 define the pair of side walls 213a, 213b. Variations of the assembled pedal 210, with the top plate 212, pair of side walls 213a, 213b, and bottom case 215, can have a width from 1.5-6 inches, a length from 2-8 inches, and a height from 0.5 to 3 inches; however alternative variations can have any other suitable width, length, and/or height.

The pedal system 200 shown in FIGS. 2A-2E also includes a main drive shaft 220 defining a pitch axis 201 about which the pedal 210 can rotate, where the main drive shaft 220 is cylindrical along at least some portions of its length. The main drive shaft 220 has a first shaft region 221a coupled to a first bearing 222a retained at the first side wall 213a, extends through the internal cavity 211 and through a second bearing 222b retained at the second side wall 213b, and terminates at a second shaft region 221b. As such, the main drive shaft 220 has a rotational degree of freedom about the pitch axis 201 of the pedal 210, but is constrained along other axes of rotation and translation. Furthermore, either of the first shaft region 221a and the second shaft region 221b can extend through its corresponding side wall 213a, 213b in order to adjoin to sporting equipment (e.g., a crank arm of a bicycle), an apparatus (e.g., rowing machines, recumbent exercise equipment), or a transportation vehicle (e.g., motorcycle, moped).

In material composition, the main drive shaft 220 is composed of a steel material (e.g., stainless steel 303); however, other embodiments of the main drive shaft 220 can be composed of another material having suitable properties. Variations of the main drive shaft 220 can have lengths from 2-8 inches and diameters from 0.2 to 2 inches. However, alternative variations of the main drive shaft 220 can have any other suitable dimensions.

As shown in FIGS. 2A-2E, the main drive shaft 220 also includes an active region 223 along its length and positioned within the internal cavity 211 of the pedal 210, where the active region 223 interacts with elements associated with transitioning the pedal system 200 between a locked mode and a released mode, where the locked mode prevents rotation of the pedal 210 relative to the main drive shaft 220 and the released mode allows rotation of the pedal 210 relative to the main drive shaft. In the system 200 shown in FIGS. 2A-2E, the active region includes a polygonal prismatic segment having substantially planar walls that physically interact with other elements in the locked mode, by way of direct physical contact. The polygonal prismatic has a regular polygonal cross-section when taking a transverse cut through the polygonal prismatic segment along its length, where the regular polygon is an octagon. However, the cross section can alternatively be defined by a non-regular polygon having any other suitable number of sides.

Alternative embodiments of the active region 223 can have a non-polygonal cross section in relation to physical interactions with other elements in the engaged mode and/or the disengaged mode. Still other embodiments of the active region 223 can operate without direct physical contact (e.g., by including magnetic regions that provide or otherwise interact with magnetic fields). Yet other alternative embodiments of the active region can operate in coordination with a sensor (e.g., force sensor, optical sensor, proximity sensor, etc.) that detects when the system 200 has engaged the user, and transitions the system 200 between a locked mode and a released mode accordingly.

As shown in FIG. 2A-2E, the system 200 also includes a wedge body 230 including a first region 231 for engaging the active region 223 of the main drive shaft 220, a second region 232 providing separation from the active region 223 of the main drive shaft 220, and a wedge arm 233. In relation to interacting with the active region 223, the first region 231 of the wedge body 230 has a substantially planar surface that physically obstructs rotational motion of the pedal 210 relative to the main drive shaft 220 by way of the polygonal prismatic segment of the main drive shaft 220. The second region 232 extends from the first region 231 and includes a recess (e.g., concave surface) that provides clearance between the wedge body 230 and the active region 223 of the main drive shaft 220 as the main drive shaft 220 rotates. The wedge arm 233 extends from the second region 232 and engages a cam surface of the trigger, as described in more detail below with reference to FIGS. 2D and 3A-3C, in relation to adjusting a position of the wedge body 230 relative to the main drive shaft 220 in order to transition the system 200 between a locked mode and a released mode, described with reference to FIGS. 3A-3C. Thus, the wedge body 230 translates along a direction transverse to the pitch axis 201 defined by the main drive shaft 220, in order to position the first region 231 and the second region 232 of the wedge body at the active region 223 of the main drive shaft 220, as appropriate. However, variations of the wedge body 230 can move relative to the main drive shaft 220, in any other suitable manner.

In material composition, the wedge body 230 is composed of a metal material (e.g., stainless steel 303, zinc-plated metal) having suitable mechanical properties in compression, shear, and wear, in relation to translation within the pedal 110 in association with locked and released modes. In particular, surfaces of the first region 231 contacting the active region 223 of the main drive shaft 220 and/or surfaces of the wedge arm 233 contacting the trigger can be coated with a material (e.g., Teflon, high molecular weight polyethylene, etc.) that reduces surface friction and/or provide good wear resistance. However variations of the wedge body 230 can be composed of another material having suitable properties. Variations of the wedge body 230 can have lengths from 0.2-2 inches, widths from 0.1-0.5 inches, and heights from 0.2-2 inches. However, alternative variations of the wedge body 230 can have any other suitable dimensions.

In relation to motion of the wedge body 230 relative to the main drive shaft 220, the pedal system 200 includes a plunger 235 retained with a translational degree of freedom along a plunger guide 238 coupled to the bottom plate of the pedal 210, where the plunger guide 238 is oriented transverse to the pitch axis defined by the main drive shaft 220. The plunger 235 has a first plunger region in communication with a biasing spring 239 and a second plunger region coupled to the wedge body, where the first plunger region is a region within an internal cavity of the plunger 235, such that the biasing spring 239 resides within the internal cavity of the plunger 235. The second plunger region can couple to the first region 231 of the wedge body with a pin and hole coupling, or any other suitable coupling to transmit force from the plunger 235 to the wedge body 230 and to maintain proper alignment between the plunger 235 and the wedge body 230. The plunger 235 shown is configured as a cylindrical body, but can alternatively have any other suitable form that facilitates translation of the wedge body 230.

In material composition, the plunger 235 is composed of a metal material (e.g., stainless steel 303) having suitable mechanical properties in compression, shear, and wear, in relation to translation relative to the wedge body 230 in association with locked and released modes. The biasing spring 239 is composed of zinc-plated music wire having a suitable spring constant. However variations of the plunger 235 and/or biasing spring 239 can be composed of another material having suitable properties. Variations of the plunger 235 can have lengths from 0.1-2 inches and diameters from 0.1-1 inches. However, alternative variations of the plunger 235 can have any other suitable dimensions.

The plunger guide 238 functions to constrain motion of the plunger 235 along a path of motion relative to the wedge body 230. The plunger guide 238 is coupled to the pedal 210 within its internal cavity 211, and can be coupled to one or more of the top plate 212, pair of side walls 213a, 213b, and/or bottom case 215 in order to properly constrain motion of the plunger 235 and the wedge body 230 coupled to the plunger 235.

As shown in FIGS. 2A-2E, the plunger guide 238 includes a cylindrical channel through which the plunger 235 translates (e.g., in a direction transverse to the pitch axis 201 defined by the main drive shaft 220), in response to forces applied by the wedge body 230 and/or the biasing spring 239. Variations of the plunger guide 238 can include any other suitable feature for guiding motion of the plunger 230 along a desired path.

In material composition, the plunger guide 238 is composed of a material (e.g., nylon 66, other nylon material, other polymer) having suitable mechanical properties in shear and wear, in relation to translation of the plunger 235 relative to the plunger guide 238 in association with locked and released modes. However variations of the plunger guide 238 can be composed of another material having suitable properties. Variations of the plunger guide 238 can have lengths from 0.1-2 inches, widths from 0.1-0.5 inches, and heights from 0.1-2 inches. However, alternative variations of the plunger guide 238 can have any other suitable dimensions.

As shown in FIGS. 2A-2E, the system 200 also includes a trigger 280 having a cam surface 281 in communication with the wedge arm 233 of the wedge body 230, where interaction with the trigger by the user's foot or footwear causes the cam surface 283 to apply pressure to the wedge arm 233 of the wedge body 230 in moving the first region 231 and the second region 232 of the wedge body 230 relative to the main drive shaft 220. The trigger 280 thus functions to transition the pedal system 200 between the locked mode and released mode described further in relation to FIGS. 3A, 3B, and 3C below. The trigger 280 is rotatable about an axis parallel to the pitch axis, where the axis is defined by a rod 250 coupled to the pair of side walls 213a, 213b within the internal cavity 211 of the pedal 210. The rod 250 is described in further detail below, in relation engaged and disengaged modes of the system 200. Thus, interaction with the trigger can simultaneously induce transitions between locked and released modes of the pedal 210, and transitions between engaged modes of the pedal 210, as described in more detail below.

As shown in FIGS. 2A-2E, the trigger 280 is coupled to the rod 250 and also exposed through the top surface 212 of the pedal 110 through the opening 214 of the top plate 212 of the pedal 210. The trigger 280 thus includes a first trigger region 281a that is coupled to the rod (e.g., by inclusion of a bore through which the rod 250 passes), where the trigger 280 is able to rotate independently of rotation of the rod 250, by way of its coupling. The trigger 280 also includes a second trigger region 281b exposed through the opening 214, whereby the user can engage the second trigger region 281b, in order to transition the pedal system 100 between the locked mode and the released mode, as described further in relation to FIGS. 3A-3C.

In morphology, the trigger 280 has a contact surface 282 that contacts the foot or footwear of the user during use of the system 200. The contact surface 282 is biased into an inclined configuration by a torsion spring 206 coupled to the rod and in communication with one or more internal surfaces of the pedal 210, such that the contact surface 282 protrudes from the opening 214 of the top plate 212 when the user is not contacting the pedal system 210. The torsion spring thus restores the trigger 280 to a state where the contact surface 282 is inclined relative to the top plate 212 of the pedal. The inclined configuration promotes engagement of the trigger 280 along a posterior-to-anterior direction by the foot of the user, such that a torsional force applied to the trigger 280 rotates the trigger 280 about the rod until the contact surface 282 is substantially flush with the opening 214. However, variations of the trigger 280 can have any other suitable surface morphology (e.g., pyramid or spherical shape, etc.) that promotes engagement with the trigger 280 along any path and/or in any other suitable manner.

The trigger 280 also has a cam surface 283 opposing the contact surface 282 and facing the internal cavity 211 of the pedal 210. The cam surface 283 interact with the wedge arm 233 of the wedge body 230, as described in relation to the locked and released modes of FIGS. 3A-3C. The cam surface 283 is a curved surface defined by one or more splines (e.g., functions defined piecewise by polynomials and used for interpolating between points). The motion of the wedge arm 233 of the wedge body 230 along the cam surface 283 produces motion of the first and second regions 231, 232 of the wedge body 230 relative to the active region 223 of the main drive shaft 220. A position of the wedge arm 233 along the cam surface 283 (e.g., a baseline position when the user is not interact with the system 200), in addition to the curvature of the cam surface 283, can be used to adjust rapidity of transitioning from the locked mode to the released mode, such that the system does not transition to the locked mod while the pedal is still rotating. The surface of the cam surface 283 can alternatively be defined in any other suitable manner.

In material composition, the trigger 280 is composed of an aluminum material (e.g., Aluminum 6061-T6) that is robust against torsional stresses, compressive stresses, and fatigue in relation to forces applied by the user's foot to the trigger 280. However, variations of the trigger 280 can be composed of another material having suitable properties. The contact surface 282 of the trigger 280 can also be coated with, treated with, or include a material that reduces friction or wear (e.g., graphite, Teflon, polyethylene, lubricant, etc.) associated with interfaces with the user's foot during operation. The cam surface 283 of the trigger 280 can also be coated with, treated with, or include a material that reduces friction or wear (e.g., graphite, Teflon, polyethylene, lubricant, etc.) associated with interactions with the wedge arm 233 of the wedge body 230 during operation.

As shown in FIG. 2E, the system can include fasteners 202 that fasten elements together, bushings 203 that allow a rotational degree of freedom for associated elements, pins 204 that fasten elements together, one or more arms including arm 205 that controls motion of the cuff 260, washers 207, torsion springs 208 that provide a biasing or return force, and/or any other suitable elements.

Figure 3A:
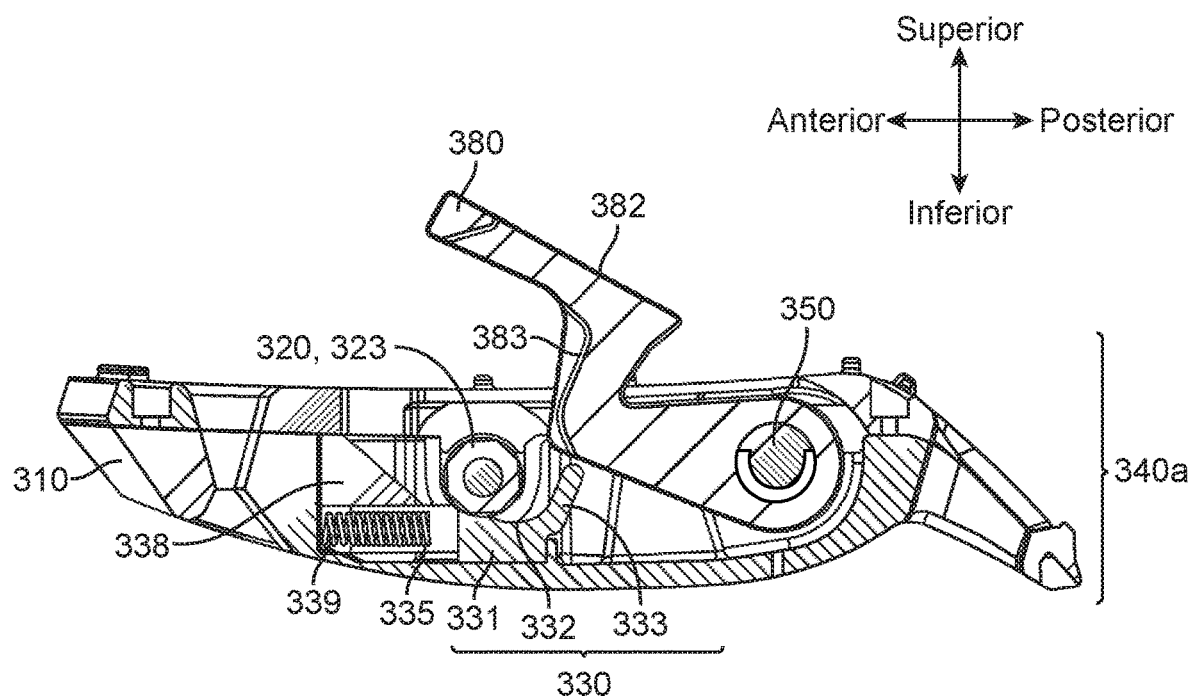
FIG. 3A depicts a cross sectional view of the pedal system of FIGS. 2A and 2B in a locked mode taken along plane 3, 6-3, 6, in accordance with one embodiment.
Figure 3B:
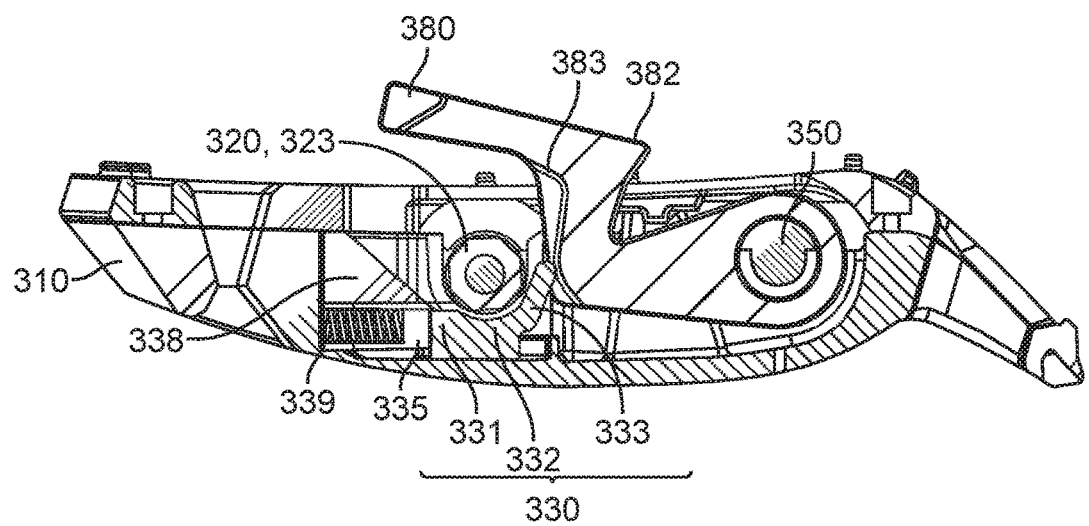
FIG. 3B depicts a cross sectional view of the pedal system of FIGS. 2A and 2B in a transitional state taken along plane 3, 6-3, 6, in accordance with one embodiment.
Figure 3C:
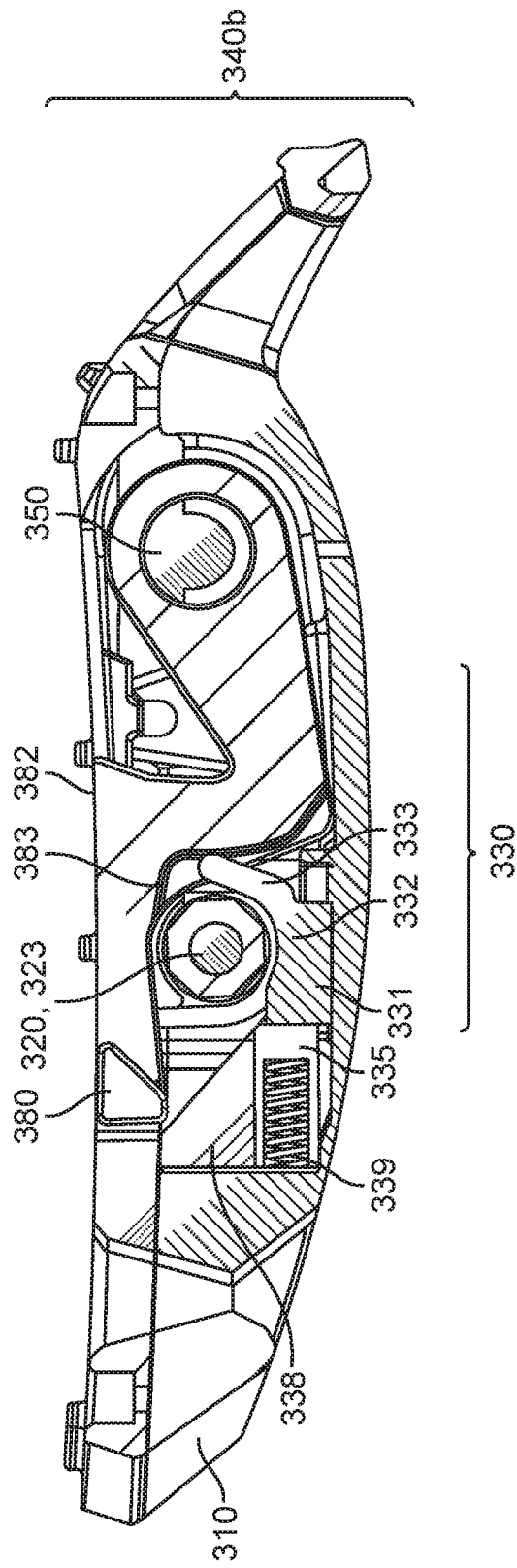
FIG. 3C depicts a cross sectional view of the pedal system of FIGS. 2A and 2B in a released mode taken along plane 3, 6-3, 6, in accordance with one embodiment.

FIG. 3A depicts a cross sectional view of the pedal system of FIGS. 2A and 2B in a locked mode, in accordance with one embodiment. FIG. 3B depicts a cross sectional view of the pedal system of FIGS. 2A and 2B in a transitional state, in accordance with one embodiment. FIG. 3C depicts a cross sectional view of the pedal system of FIGS. 2A and 2B in a released mode, in accordance with one embodiment.

In the locked mode 340a of FIG. 3A, rotation of the pedal 310 about the main drive shaft 320 is prevented, thereby allowing the user to easily place his or her foot into the pedal 310. Without the locked mode 340a, the pedal 310 could otherwise be in a rotated-forward or rotated-reversed configuration that would make it difficult for the user to engage the pedal 310. In more detail, in the locked mode 340a the trigger 380 is unloaded, the wedge arm 333 is at a first position along the cam surface 383, and the biasing spring 339 is in an extended state, thereby positioning the plunger 335 such that the first region 331 of the wedge body 330 is positioned at the polygonal prismatic segment of the active region 323. As such, the flat surface of the first region 331 physically contacts a flat face of the polygonal prismatic segment of the active region 323, thereby preventing rotation of the pedal 310 about the pitch axis of the main drive shaft 320.

In the transitional state of FIG. 3B, the pedal 310 is in between the locked mode 340a and the released mode 340b. The transitional state is a state in which the user interacts with the trigger 380 while placing his or her foot at the pedal 310. In more detail, in the transitional state the trigger 380 is loaded as the user applies a torsional force to the trigger against the torsion spring, the wedge arm 333 is at a second position along the cam surface 383, and the biasing spring 339 is in a slightly compressed state, thereby positioning the plunger 335 such that the first region 331 of the wedge body 330 is moved away from the polygonal prismatic segment of the active region 323, and the second region 332 is moved into position under the polygonal prismatic segment of the active region 323. As such, the flat surface of the first region 331 is moved away from a flat face of the polygonal prismatic segment of the active region 323, in the transitional state.

In the released mode 340b of FIG. 3C, the pedal 310 can rotate relative to the main drive shaft 320. The released mode 340b is associated with the user placing his or her foot at the pedal 310. In more detail, in the released mode 340b the trigger 380 is loaded due to the torsional force applied to the trigger against the torsion spring, the wedge arm 333 is at a third position along the cam surface 383, and the biasing spring 339 is in a compressed state, thereby positioning the plunger 335 such that the second region 332 of the wedge body 330 positioned under the polygonal prismatic segment of the active region 323. As such, the curved surface of the second region 331 is moved under the polygonal prismatic segment of the active region 323, which allows the pedal 310 to rotate relative to the main drive shaft 320 due to the clearance provided by the second region 332 of the wedge body 330.

Figure 4:
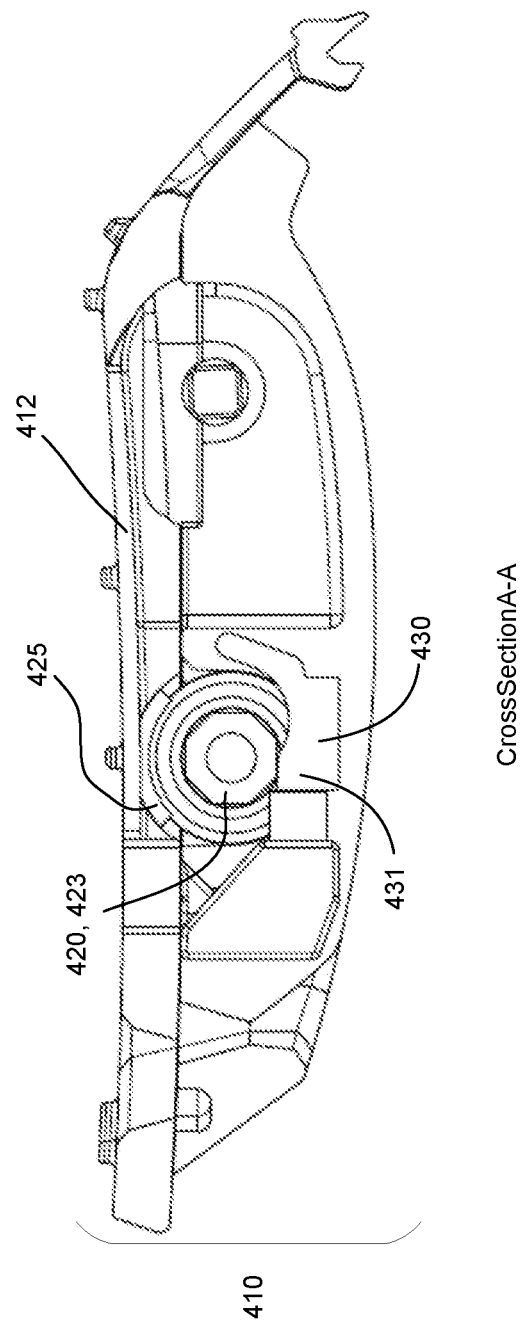
FIG. 4 is a cross-sectional view of the pedal system along plane A-A in FIG. 2C that depicts a breakaway operation associated with the locked mode of FIG. 3A, in accordance with one embodiment.

FIG. 4 is a cross-section along plane A-A that depicts elements associated with a breakaway operation associated with the locked mode of FIG. 3A, in accordance with one or more embodiments. In FIG. 4, a compressible cap 425, which is also shown in FIG. 2E as compressible cap 225, is positioned between the top of the main drive shaft 420 and the top plate 412 of the pedal 410 with a strap (shown in FIG. 2D as strap 226). The compressible cap 425 functions to allow the active region 423 of the main drive shaft 420 to be deflected away from the first region 431 of the wedge body 430 in a locked mode, such that, if the locked mode is not appropriate for a specific scenario, the locked mode can be overcome. An example of a specific scenario includes a portion of the pedal 410 (e.g., a front edge) being caught in terrain, where, if a sufficient force is applied to the pedal 410 by the terrain in the locked mode, the compressible cap 425 compresses and allows the main drive shaft 420 to be displaced from the wedge body 430, thereby allowing the locked mode to be overcome without compromising (e.g., breaking) other elements of the system. As such, in one direction of rotation of the main drive shaft in the locked mode, the compressible caps are compressed allowing deflection of the main drive shaft 420, and in another direction of rotation of the main drive shaft 420, the wedge associated with the active region is back driven.

The compressible cap 425 is composed of an elastomeric material (e.g., urethane) having a desired elastic modulus in compression; however, variations of the compressible cap 425 can alternatively be composed of any other suitable material. Furthermore, the main drive shaft 420 can be coupled to more than one compressible cap 425 along its length.

Material properties of the compressible cap 425 can be tuned in order to control a threshold level of force beyond which the locked mode is overcome. As such, the compressible cap 425 can be composed of urethane or other polymer having a designed porosity, level of crosslinking, and any other suitable material or physical feature that results in desired behavior under compression or relaxation.

Figure 5A:
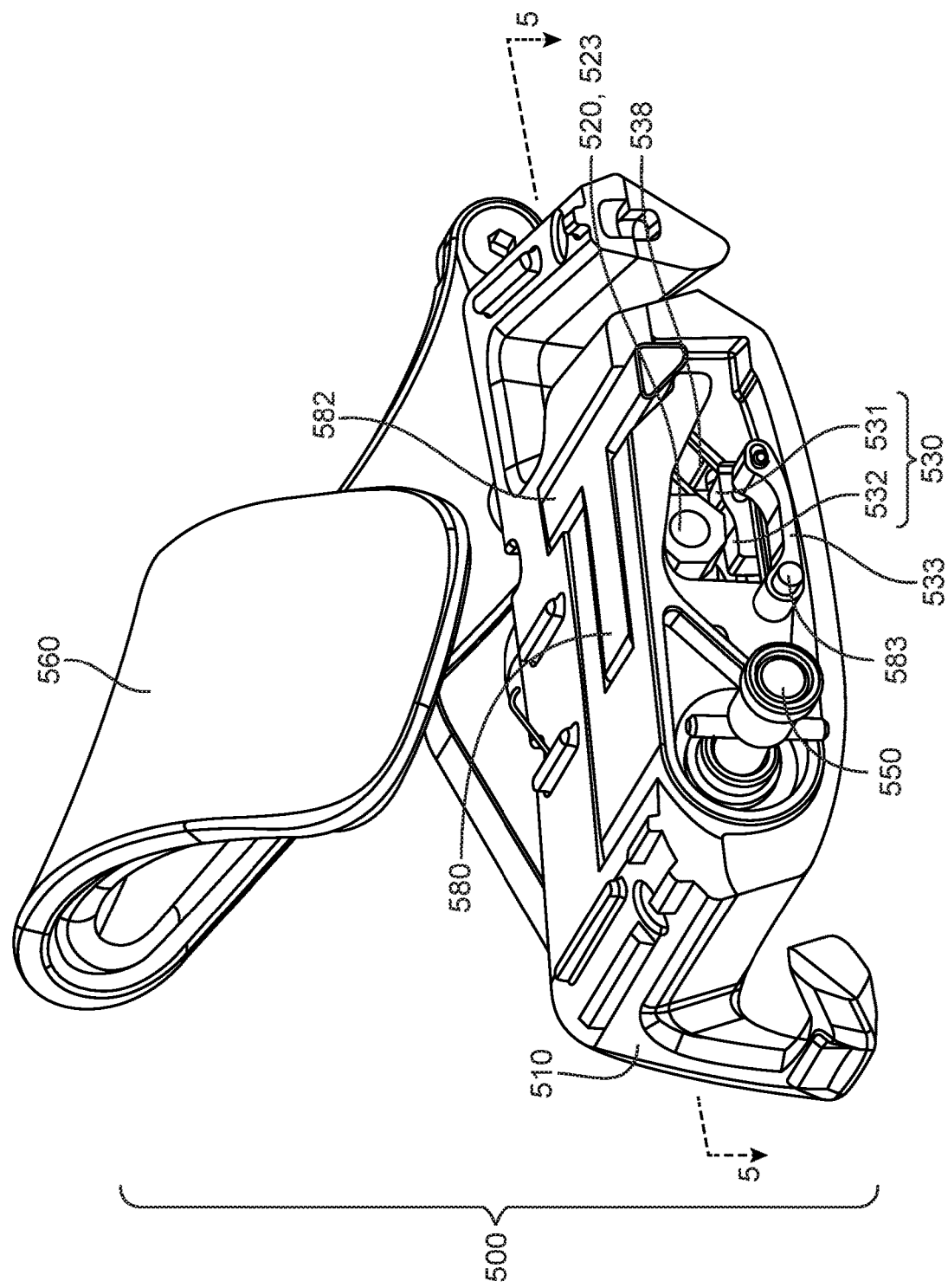
FIG. 5A is a perspective view of an alternative embodiment of the pedal system of FIG. 2A cut along a plane, in accordance with one embodiment.
Figure 5B:
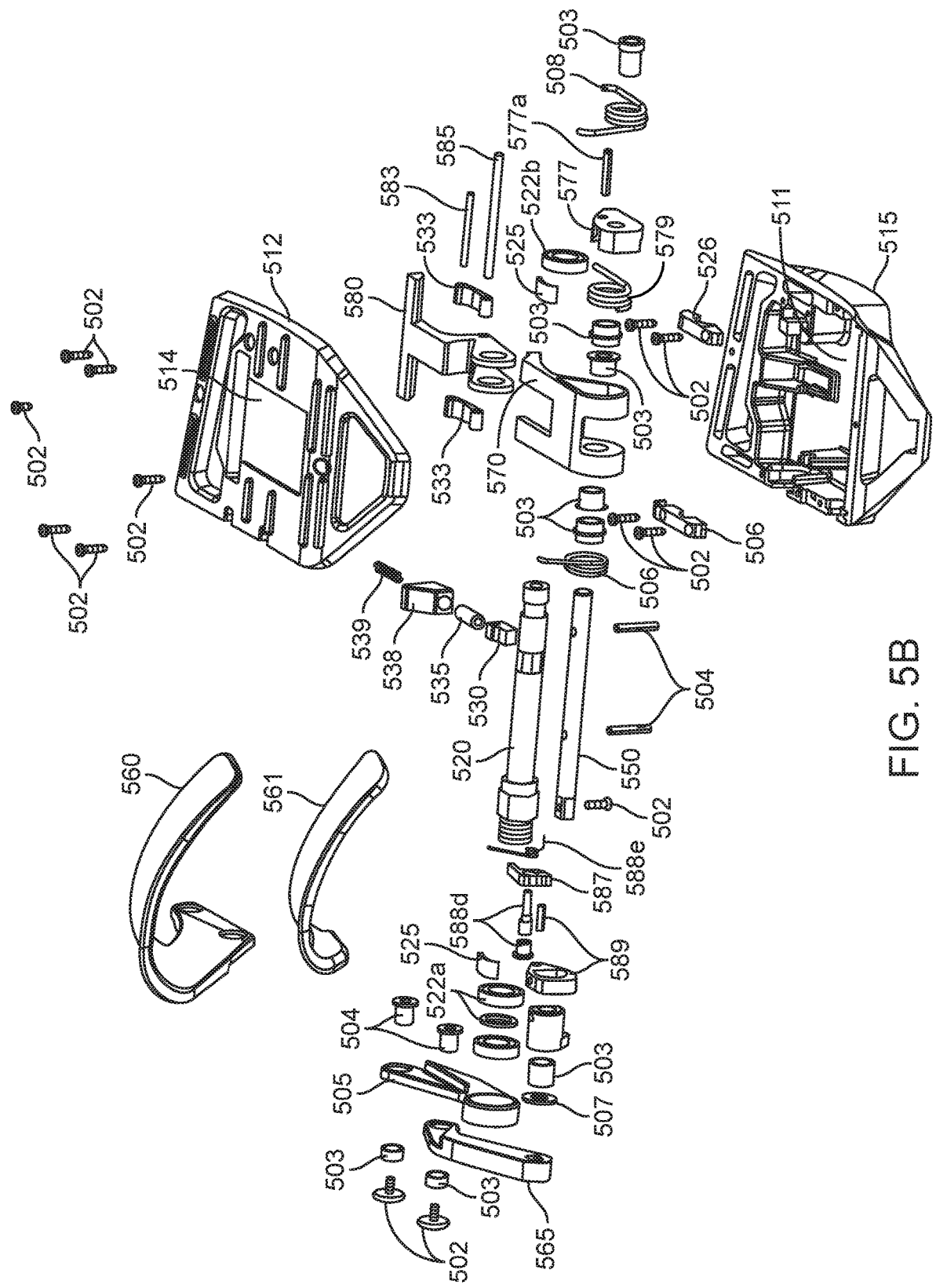
FIG. 5B depicts an exploded view of the alternative embodiment of the pedal system shown in FIG. 5A.

FIG. 5A is a perspective view of the pedal system of FIG. 2A cut along a plane (analogous to the plane of FIG. 2B), in accordance with one embodiment. FIG. 5B is an exploded view of the pedal system of FIG. 5A, in accordance with one embodiment. The fasteners 502, bushings 503, pins 504, arms 505 and 565, washers 507, torsion springs 506 and 508, bottom case 515, internal cavity 511, top plate 512, opening 514, main drive shaft 520, first bearing 522a, second bearing 522b, compressible cap 525, strap 526, wedge body 530, plunger 535, plunger guide 538, spring 539, rod 550, cuff 560, pad 561, lever 570, arbor 577, pin 577a, torsion spring 579, trigger 580, pawl 587, pawl pin 588d, pawl spring 588e, and sector gear 589 of FIGS. 5A-5B correspond with elements of FIGS. 2A-2E. In particular, the wedge body 530 includes a first region 531 analogous to the first region 231 and a second region 532 analogous to the second region 232 of the wedge body 230 shown in FIGS. 2A-2E.

The embodiment of the pedal system 500 shown in FIGS. 5A-5E also has a trigger connection 583 protruding from a portion of the trigger 580 within in the internal cavity 511, where the trigger connection 583 couples to a link 533 that couples to the wedge body 530. The trigger connection 583 transforms rotational motion of the trigger 580 about the rod 550 into rotational motion of the link 533, in order to affect motion of the wedge body 530 relative to the active region 523 of the main drive shaft 520, described in relation to FIGS. 5C-5E below. The trigger connection 583 passes from one side of the trigger 580, through the link, through the trigger 580, and protrudes through the other side of the trigger 580 to function in an analogous manner to the trigger pin 285 of FIGS. 2A-2E. As such, a portion of the trigger connection 583 protrudes from the trigger to interact with the pawl 587, thereby forming a locking mechanism with the sector gear 589.

The link 533 is coupled at one end to the trigger connection 583 and coupled at another end to the wedge body 530, and functions to transform rotational motion of the trigger 580 into translation of the wedge body 530 relative to the active region 523 of the main drive shaft 520. The end of the link 533 coupled to the wedge body 530 can thus include a slotted opening region or any other suitable mechanism for converting rotational motion to translational motion.

Figure 5C:
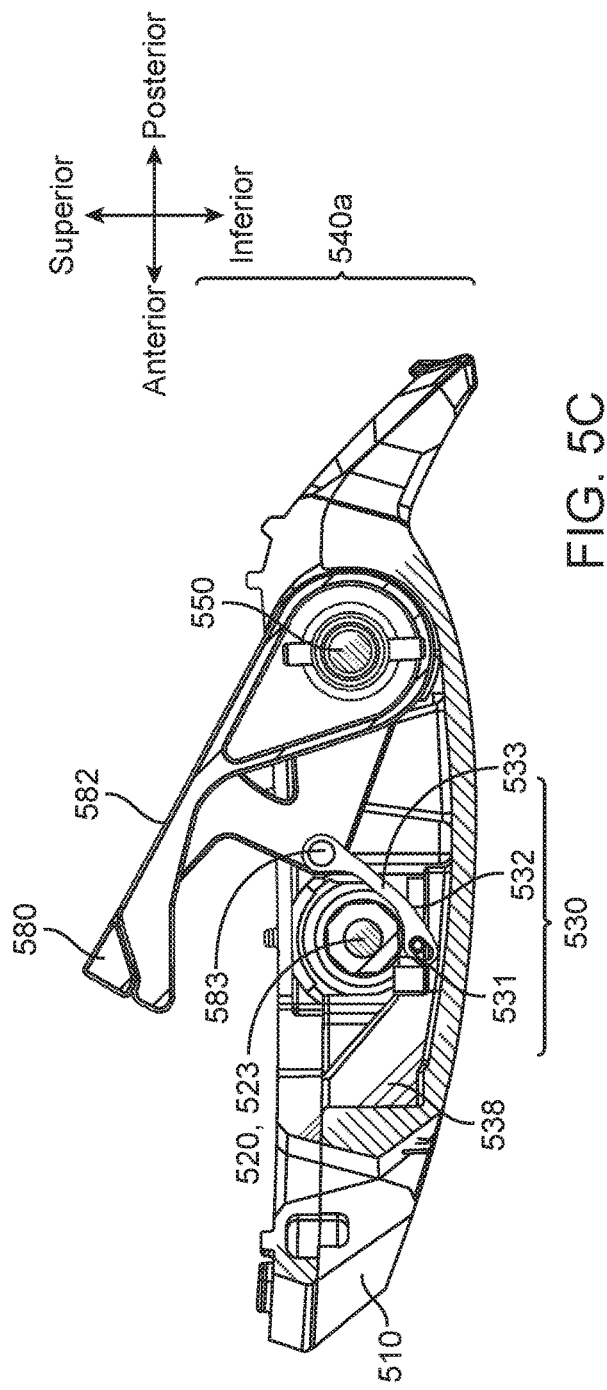
FIG. 5C depicts a cross sectional view of the pedal system of of FIG. 5A in a locked mode taken along plane 5-5, in accordance with one embodiment.
Figure 5D:
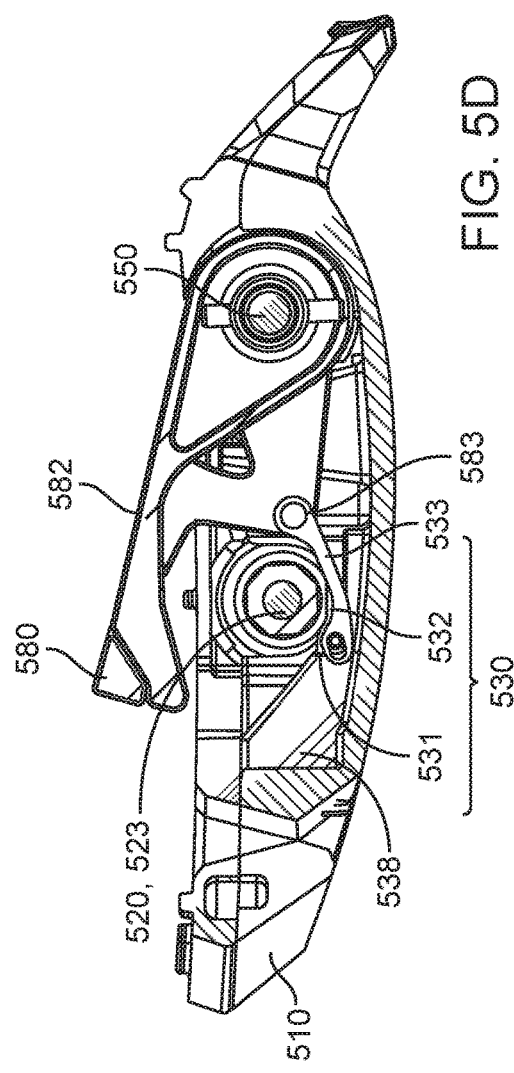
FIG. 5D depicts a cross sectional view of the pedal system of FIG. 5A in a transitional state taken along plane 5-5, in accordance with one embodiment.
Figure 5E:
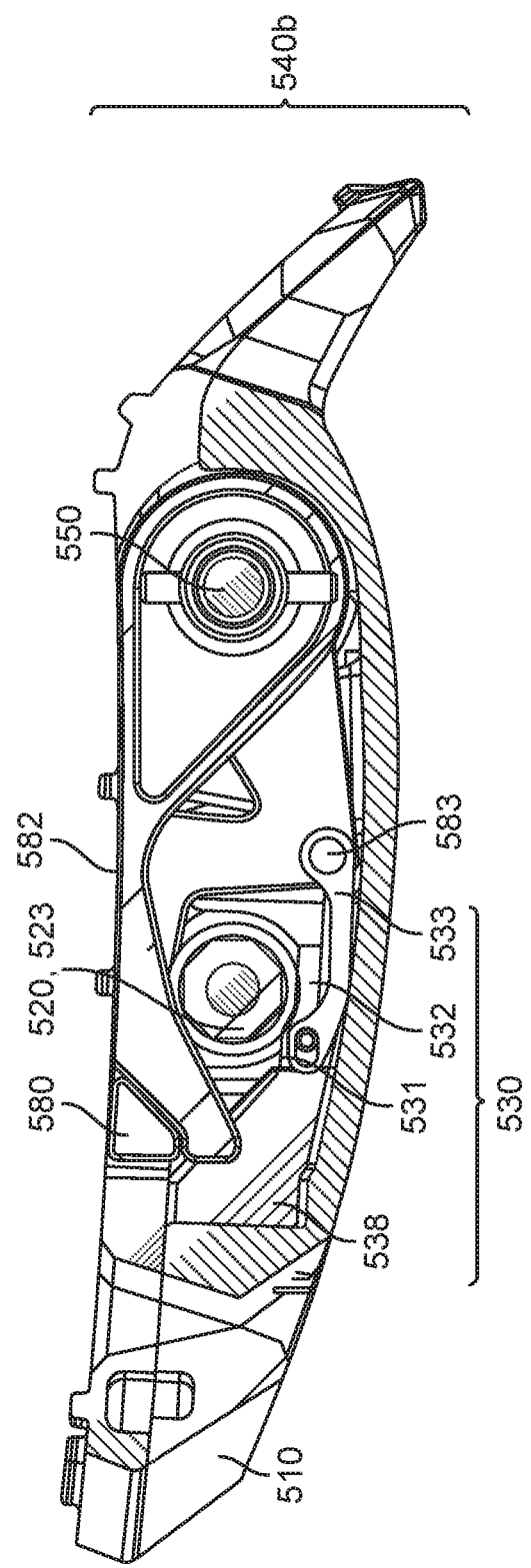
FIG. 5E depicts a cross sectional view of the pedal system of FIG. 5A in a released mode taken along plane 5-5, in accordance with one embodiment.

FIG. 5C depicts a cross sectional view of the pedal system of FIGS. 5A and 5B in a locked mode, in accordance with one embodiment. FIG. 5D depicts a cross sectional view of the pedal system of FIGS. 5A and 5B in a transitional state, in accordance with one embodiment. FIG. 5E depicts a cross sectional view of the pedal system of FIGS. 5A and 5B in a released mode, in accordance with one embodiment.

In the locked mode 540a of FIG. 5C, rotation of the pedal 510 about the main drive shaft 520 is prevented, thereby allowing the user to easily place his or her foot into the pedal 510. Without the locked mode 540a, the pedal 510 could otherwise be in a rotated-forward or rotated-reversed configuration that would make it difficult for the user to engage the pedal 510. In more detail, in the locked mode 540a the trigger 580 is unloaded, the link 533 is in a rotational configuration that, with the biasing spring 539 and the plunger 535, positions the first region 531 of the wedge body 530 at the polygonal prismatic segment of the active region 523. As such, the flat surface of the first region 531 physically contacts a flat face of the polygonal prismatic segment of the active region 523, thereby preventing rotation of the pedal 510 about the pitch axis of the main drive shaft 520.

In the transitional state of FIG. 5D, the pedal 510 is in between the locked mode 540a and the released mode 540b. The transitional state is a state in which the user interacts with the trigger 380 while placing his or her foot at the pedal 310. In more detail, in the transitional state the trigger 580 is loaded as the user applies a torsional force to the trigger against the torsion spring, the link 533 is in a second rotational configuration that, with the biasing spring 539 in a slightly compressed state, positions the plunger 535 such that the first region 531 of the wedge body 530 is moved away from the polygonal prismatic segment of the active region 523, and the second region 532 of the wedge body 530 is moved into position under the polygonal prismatic segment of the active region 523. As such, the flat surface of the first region 531 is moved away from a flat face of the polygonal prismatic segment of the active region 523, in the transitional state.

In the released mode 540b of FIG. 5C, the pedal 510 can rotate relative to the main drive shaft 520. The released mode 540b is associated with the user placing his or her foot at the pedal 510. In more detail, in the released mode 540b the trigger 580 is loaded due to the torsional force applied to the trigger against the torsion spring, the link 533 is in a third rotational configuration that, with the biasing spring 339 in a compressed state, positions the plunger 535 such that the second region 532 of the wedge body 530 positioned under the polygonal prismatic segment of the active region 523. As such, the surface of the second region 531 is moved under the polygonal prismatic segment of the active region 523, which allows the pedal 510 to rotate relative to the main drive shaft 520 due to the clearance provided by the second region 532 of the wedge body 530.

FIG. 2A depicts a perspective view of a pedal system, in accordance with one embodiment. FIG. 2B depicts another perspective view of the pedal system shown in FIG. 2A, in accordance with one embodiment. FIG. 2C depicts a perspective view of the pedal system of FIG. 2A with a top plate removed, in accordance with one embodiment. FIG. 2D is a perspective view of the pedal system of FIG. 2A cut along plane A, in accordance with one embodiment. FIG. 2E is an exploded view of the pedal system of FIG. 2A, in accordance with one embodiment.

The top plate 212 shown in FIGS. 2A-2E includes an opening 214, where elements of the pedal system 200 that interact with the user and to cause transitions between modes of the pedal system 200 as a result of such interactions pass through the opening 214. In the variation shown in FIGS. 2A-2E, the top plate 212 of the pedal 210 is composed of an aluminum material (e.g., Aluminum-6061-T6) in relation to providing sufficient mechanical properties and overall weight of the system; however, alternative embodiments of the top plate 212 can alternatively be composed of any other suitable material.

The pedal 210 can also have a bottom case 215 that supports internal elements contained within the internal cavity 211. The main material of the bottom case 215 shown in FIGS. 2A-2E is composed of a nylon-based material (e.g., Nylon 66, Nylatron, etc.) having desired wear properties, self-lubricating properties, and/or other properties; however, alternative variations of the bottom case 215 can alternatively be composed of any other suitable material.

The top plate 212 can be coupled to the bottom case 215 at peripheral regions of the plates 212 and 215 (e.g., using fasteners, using a thermal bonding process, using an adhesive bonding process), where inferior portions of the top plate 212 and superior portions of the bottom case 215 define the pair of side walls 213a, 213b. Various embodiments of the assembled pedal 210, with the top plate 212, pair of side walls 213a, 213b, and bottom case 215, can have a width from 1.5-6 inches, a length from 2-8 inches, and a height from 0.5 to 3 inches; however alternative variations can have any other suitable width, length, and/or height.

The pedal system 200 shown in FIGS. 2A-2E also includes a rod 250 defining an axis about which other elements can rotate in relation to causing motion of the cuff, retaining a position of the cuff, and/or releasing the cuff. The rod 250 is cylindrical along at least some portions of its length, and the axis defined by the rod 250 can be parallel to and offset from the pitch axis of the main drive shaft 220 described above. The rod 250 has a first rod region 251a coupled to a first bearing retained at the first side wall 212a, extends through the internal cavity 211 and through a second bearing retained at the second side wall 212b, and terminates at a second rod region 251b. As such, the rod 250 has a rotational degree of freedom about the axis, but is constrained along other axes of rotation and translation. Furthermore, either of the first rod region 251a and the second shaft region 251b can extend through its corresponding side wall 213a, 213b in order to adjoin to a cuff 260 or other components coupling the rod 250 to the cuff 260.

In material composition, the rod 250 is composed of an aluminum material (e.g., Aluminum 6061-T6); however variations of the rod 250 can be composed of another material having suitable properties. Some embodiments of the rod 250 can have lengths from 2-8 inches and diameters from 0.2 to 2 inches. However, alternative embodiments of the rod 250 can have any other suitable dimensions.

The cuff 260, as shown in FIGS. 2A-2E, functions to retain a user's foot or footwear at the pedal 210 in an engaged mode and to enable release of the user's foot or footwear from the pedal 210 in a disengaged mode, where the engaged mode and the disengaged mode are variations of modes 190a and 190b described above with reference to FIG. 1C. The cuff 260 also functions to robustly support the user's foot or footwear at the pedal 210 (e.g., with a compressive force provided by the cuff 160 and the pedal 210). In material composition, the cuff 260 is composed of a material that is robust against bending stresses, shear stresses, compressive stresses, tensile stresses, and fatigue, in relation to forces incurred at the cuff 260 while a user interacts with the system 200. The cuff 260 is composed of a polymeric material (e.g., Nylon 66, other polymer material). However, variations of the cuff 260 can be composed of another material having suitable properties.

The cuff 260 also functions to provide comfort to the user as the user performs an activity, by inclusion of soft, resilient, and/or otherwise compliant materials that interface with the user's foot or footwear during operation of the system 200 in the engaged mode 290a. As such, portions of the cuff 260 (e.g., portions of the cuff 160 facing the foot or footwear of the user) are coupled to a pad 261 composed of a urethane foam material (urethane foam 4701-40-15375) having a thickness of 9.35 mm.

In morphology, the cuff 260 can has a concave surface facing the user's foot or footwear, such that the concave surface is complementary to the shape of the foot or footwear of the user. The cuff 260 shown in FIGS. 2A-2E has a closed medial side 295 and an open lateral side 296 that allows the user to rapidly and easily disengage the system 100 during critical moments. The cuff 260 also has open anterior and posterior sides. The morphology of the cuff 260 is designed be appropriate for variations in user foot morphology (e.g., in terms of shoe size, in terms of width, etc.). In the engaged mode described, the cuff 260 spans a cuneiform region of the user's foot, and to be released from the cuneiform region as the user disengages the system.

The cuff 260 may be coupled to the rod 250, such that a force applied to the lever 270 described below rotates the rod 250 and allows the cuff 260 to comfortably compress (e.g., with a desired amount of force) the user's foot or footwear between the top surface 112 of the pedal 110 and the pad 261 of the cuff 160. Coupling between the cuff 260 and the rod 250 is at a region of the rod 250 outside of the body of the pedal 110 (e.g., at a portion of the rod 250 extending through a medial side wall of the pedal 210 and exterior to the pedal 210).

As shown in FIGS. 2A-2E, the cuff 260 is coupled to the rod 250 by an arm 265 coupled to a portion of the rod 150 extending through a medial side wall of the pedal 110 and exterior to the pedal 110, where the arm 165 transforms rotation of the rod 150 induced by the lever 270 (described below) into motion of the cuff 260 along an inferior-superior direction, thereby retaining and releasing the foot of the user during different modes of operation.

The arm 265 has a linkage form factor and includes bores at its ends for fastening to the rod 250 and to the cuff 260. In morphology, the arm 265 includes recessed portions that enable the arm 265 to be structurally robust against bending and compression, with less overall material volume. The arm 265 is composed of aluminum (e.g., aluminum 6061-T6). However, variations of the arm 265 can be composed of another material having suitable properties. Variations of the arm 265 can have a length from 2-8 inches, a width from 0.2-0.75 inches, and a height from 1-5 inches. However, alternative variations of the arm 265 can have any other suitable dimensions. Furthermore, the cuff 260 can couple to other components of the system (e.g., the main drive shaft 220 described) with any other suitable number of arms, in order to define a path and range of motion of the cuff 260 in associated with transitions between different modes of the system.

The lever 270, as shown in FIGS. 2A-2E, functions to repeatedly and reversibly transition the cuff 260 between a configuration that retains the foot of the user and a configuration that releases the foot of the user, in association with the engaged mode and the disengaged mode described below. The lever 270 is coupled to the rod 250 and also exposed through the top plate 212 of the pedal 210 through the opening 214. The lever 270 includes a first lever region 271a that is coupled to the rod (e.g., a portion of the rod 250 within the internal cavity 211 of the pedal 210), such that motion of the lever 270 is coupled with rotation of the rod 250. The first lever region 271a includes a pair of bores through which the rod 250 passes, where the pair of bores is spaced about the first trigger region 281a of the trigger 280, within the internal cavity 211. The lever 270 also includes a second lever region 2711b exposed through the opening 214, whereby the user can engage the second lever region 271b, thereby inducing motion of the rod 250 in association with transitioning the system 110 between the engaged mode and the disengaged mode described below in relation to FIGS. 6A-6C.

In morphology, the lever 270 has a contact surface 272 that contacts the foot or footwear of the user during use of the system 200. The contact surface 282 is biased into an inclined configuration and coupled to the trigger 280 (described below) in its baseline unloaded state, such that the contact surface 272 protrudes from the opening 214 of the top plate 212 when the user is not contacting the pedal system 210. The inclined configuration promotes engagement of the lever 270 along a posterior-to-anterior direction by the foot of the user, such that a torsional force applied to the lever 270 rotates the lever 270 about the rod 250 until the contact surface 272 is substantially flush with the opening 214. However, variations of the lever 270 can have any other suitable surface morphology (e.g., pyramid or spherical shape, etc.) that promotes engagement with the trigger 270 along any path and/or in any other suitable manner.

Figure 6C:
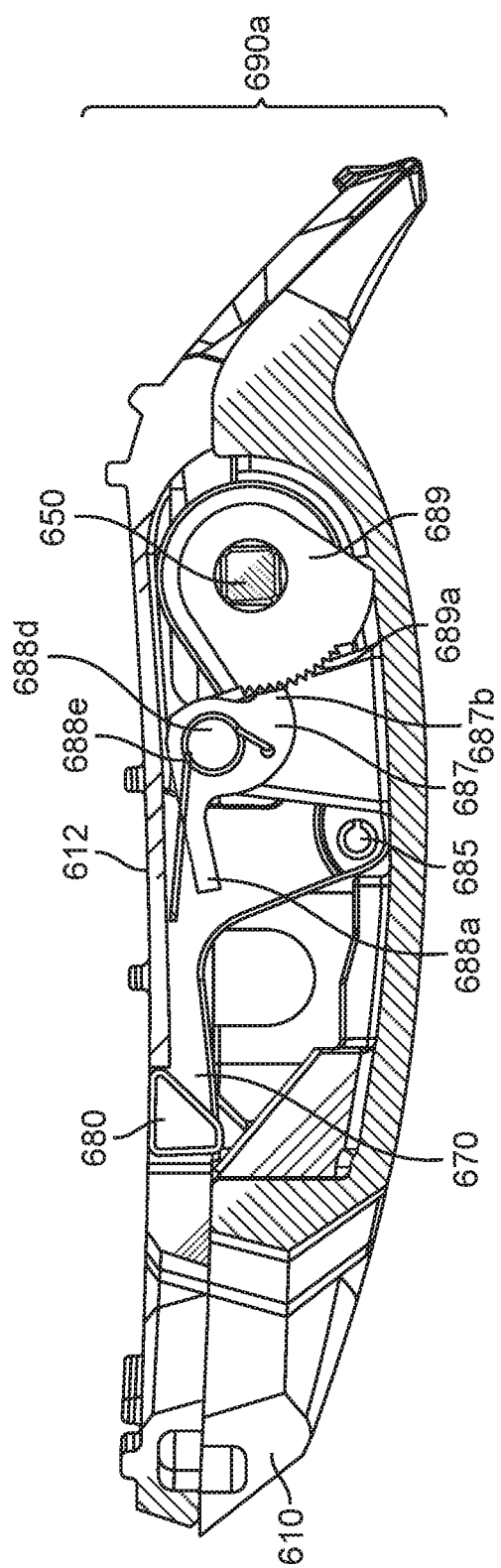
FIG. 6C depicts a cross sectional view of the pedal system of FIGS. 2A and 2B in an engaged mode taken along plane 2-2, in accordance with one embodiment.

The lever 270 also has at least one tab 273 extending from the contact surface 272, where the tab 273 interacts with the lever 270, as described in relation to the engaged and disengaged modes of FIGS. 6A-6C. The tab 273 engages a portion of the trigger 280, where the tab 273 promotes coupling between the lever 270 and the trigger 280 during a first direction of motion (e.g., when transitioning from the disengaged mode to the engaged mode). The tab 273 can also allow motion of the lever 270 to be uncoupled from motion of the trigger 280 during a second direction of motion (e.g., when transitioning from the engaged mode to the disengaged mode). The tab 273 is one of a pair of tabs protruding posteriorly from the contact surface 272 of the lever 270, where the pair of tabs contacts a T-shaped portion of the contact surface 282 of the trigger 280 described below; however, the tab(s) 273 can alternatively have any other suitable morphology.

In material composition, the lever 270 is composed of an aluminum material (e.g., Aluminum 6061-T6) that is robust against torsional stresses, compressive stresses, and fatigue in relation to forces applied by the user's foot to the lever 270. However, variations of the lever 270 can be composed of another material having suitable properties. The contact surface 272 of the lever 270 can also be coated with, treated with, or include a material that reduces friction or wear (e.g., graphite, Teflon, polyethylene, lubricant, etc.) associated with interfaces with the user's foot during operation.

As shown in FIGS. 2A-2E, the trigger 280 is coupled to the rod 250 and also exposed through the top surface 212 of the pedal 110 through the opening 214 of the top plate 212 of the pedal 210, in proximity to the lever 270. The trigger 280 functions to cause locking of a position of the cuff 260 in the engaged mode and to cause unlocking of the position of the cuff 260 in the disengaged mode, thereby allowing the user to release his or her feet from the system in an efficient and intuitive manner and prevent trapping of the user's foot at the pedal when the user wishes to disengage the system. The trigger 280 includes a first trigger region 281a that is coupled to the rod (e.g., by inclusion of a bore through which the rod 250 passes), where the trigger 280 is able to rotate independently of rotation of the rod 250, by way of its coupling. The bore of the trigger 280 is thus configured between the pair of bores of the lever 270 within the internal cavity 211. The trigger 280 also includes a second trigger region 281b exposed through the opening 214, whereby the user can engage the second trigger region 281b, in order to transition the pedal system 100 between the engaged mode and the disengaged mode, as described further in relation to FIGS. 6A-6C.

In morphology, the trigger 280 has a contact surface 282 that contacts the foot or footwear of the user during use of the system 200. The contact surface 282 is biased into an inclined configuration by a torsion spring coupled to the rod and in communication with one or more internal surfaces of the pedal 210, such that the contact surface 282 protrudes from the opening 214 of the top plate 212 when the user is not contacting the pedal system 210. The torsion spring thus restores the trigger 280 to a state where the contact surface 282 is inclined relative to the top plate 212 of the pedal. The inclined configuration promotes engagement of the trigger 280 along a posterior-to-anterior direction by the foot of the user, such that a torsional force applied to the trigger 280 rotates the trigger 280 about the rod until the contact surface 282 is substantially flush with the opening 214. However, variations of the trigger 280 can have any other suitable surface morphology (e.g., pyramid or spherical shape, etc.) that promotes engagement with the trigger 280 along any path and/or in any other suitable manner.

As described briefly above, the trigger 280 has a T-shaped portion 284 extending posteriorly from the contact surface 282, where the T-shaped portion 284 engages the tab(s) 273 of the lever 270 in relation to linked motion of the lever 270 with the trigger 280. The T-shaped portion 284 can, however, be alternatively configured with any other suitable morphology.

The trigger 280 also has a trigger pin 285 protruding laterally from a portion of the trigger 280 within the internal cavity 211 of the pedal 210, where the trigger pin 285 interacts with a locking subsystem including a pawl 287 and a sector gear 289, described in more detail below. The trigger pin 285 of the trigger 280 thus promotes locking of a position of the rod 250, arm 265, or cuff 260 in the engaged mode and rapidly releases locking of a position of the rod 250, arm 265, or cuff 260 in the disengaged mode described in more detail below in relation to the engaged and disengaged modes of FIGS. 6A-6C.

In material composition, the trigger 280 is composed of an aluminum material (e.g., Aluminum 6061-T6) that is robust against torsional stresses, compressive stresses, and fatigue in relation to forces applied by the user's foot to the trigger 280. The contact surface 282 of the trigger 280 can also be coated with, treated with, or include a material that reduces friction or wear (e.g., graphite, Teflon, polyethylene, lubricant, etc.) associated with interfaces with the user's foot during operation.

FIGS. 2A-2E also depicts a pawl 287, which functions, with a sector gear 289 and trigger pin 285 to provide a mechanism that causes locking of the cuff 260 in position during use of the system by a user. The pawl 287 includes a pawl tab 288a that lies within a path of motion of the trigger pin 285 within the internal cavity as the trigger 280 is rotated from a baseline disengaged position to a fully engaged position (e.g., where the user's foot is seated at a top plate 212 of the pedal 210). Opposite the pawl tab 288a, the pawl 287 includes a set of teeth 288b that engage a sector gear 289 coupled to the rod 250, where engagement between the set of teeth 288b of the pawl 287 with the sector gear 289 causes locking of a position of the cuff 260 to retain the foot of the user at the pedal 210, and disengagement between the set of teeth 288b of the pawl 287 from the sector gear 289 causes the position of the cuff 260 to be unlocked to release the foot of the user from the pedal 210. The set of teeth 288b of the pawl 287 in FIGS. 2A-2E includes three teeth, described in more detail below; however, variations of the pawl 287 can include any other suitable number of teeth 287b.

The pawl 287 also includes a bore 288c between the pawl tab 288a and the set of teeth 288b, where a pawl pin 288d passes through the bore 288c and provides an axis of rotation of the pawl 287 relative to the sector gear 289. The axis of rotation is parallel to and offset from the axis of rotation defined by the rod 250. Additionally, the pawl pin 288d can be coupled to a torsion spring 288e that biases the set of teeth 288b of the pawl 287 into engagement with the sector gear 289 whenever the trigger pin 285 does not contact the pawl tab 288a. However, in variations of the system, the axis of the pawl 287 and the axis of the rod 250 can be oriented relative to each other in any other suitable manner, and the pawl 287 can be biased into any other suitable baseline configuration in any other suitable manner.

In material composition, the pawl 287 is composed of a steel material (e.g., steel plated material, 303 stainless steel, etc.) that is robust against torsional stresses, compressive stresses, and bending stresses, and crack propagation in relation to forces applied to the pawl 287 by the trigger pin 285 and the sector gear 289. However, variations of the pawl 287 can be composed of another material having suitable properties.

The sector gear 289 is coupled to the rod 250 and constrained to rotate with rotation of the rod 250. The sector gear 289 has a set of teeth 289a facing the set of teeth 288b of the pawl 287, in order to provide the locking subsystem described above. In material composition, the sector gear 289 is composed of a steel material (e.g., steel plated material, 303 stainless steel, etc.) that is robust against torsional stresses, compressive stresses, and bending stresses, and crack propagation in relation to forces applied to sector gear 289 by the pawl 287 and other elements. In variations, the sector gear 289 can be substituted with any suitable component having teeth that interact with the pawl 287 as appropriate.

FIG. 6A depicts a cross sectional view of the pedal system of FIGS. 2A and 2B in a disengaged mode 690b, in accordance with one embodiment. FIG. 6B depicts a cross sectional view of the pedal system of FIGS. 2A and 2B in a transitional state, in accordance with one embodiment. FIG. 6C depicts a cross sectional view of the pedal system of FIGS. 2A and 2B in an engaged mode 690a, in accordance with one or more embodiments.

In the disengaged mode 590b of FIG. 6A, the trigger 680 and the lever 670 are in their baseline, unloaded states where the user has not applied a torsional force to the trigger 680 and lever 670 by stepping onto the top plate 612 of the pedal 610. The trigger 680 is coupled to the rod 650 and includes a trigger pin 685 protruding from a main body of the trigger 680 within the internal cavity of the pedal 610. The trigger pin 685 is contacting the pawl tab 688a of the pawl 687 in the disengaged mode 690b due to a biasing force provided by a torsion spring that maintains the trigger 680 in an inclined state relative to the top plate 612 when no force is applied to the trigger 680 by the user's foot. In this position, the set of teeth 688b of the pawl 687 do not contact the set of teeth 688a of the sector gear 688; thus, the position of the cuff is not locked.

In the transitional state of FIG. 6B, a torsional force has been applied to the trigger 680 (e.g., by a user stepping onto the top plate 612 of the pedal 610), and the lever 670 rotates with the trigger 680 due to contact between the tabs of the lever 670 and the T-shaped protrusion of the trigger 680. As the torsional force is applied to the trigger 680 by the user's foot, the trigger 680 rotates about the rod 650 into a configuration where the trigger pin 685 no longer contacts the pawl tab 688a, and a torsion spring 688e coupled to the pawl pin 688d passing through the pawl 687 biases the set of teeth 688b of the pawl 687 into contact with the set of teeth 689a of the sector gear 689. As more torsional force is applied to the trigger 680 and the lever 670 by the user's foot, the cuff coupled to the rod 650 continues to ratchet down to comfortably compress the foot of the user between the top plate 612 of the pedal 610 and the cuff (not shown).

In the engaged mode 690a of FIG. 6C, the trigger 680 has been fully rotated such that its contact surface 682 is flush with the opening of the top plate 612 of the pedal 610, the trigger pin 685 is fully displaced away from the pawl tab 688a, and the position of the cuff coupled to the rod 650 is substantially locked due to engagement between the set of teeth 688b of the pawl 687 and the set of teeth 689a of the sector gear 689.

In association with transitioning from the engaged mode 690a of FIG. 6C to the disengaged mode 690b of FIG. 6A, when the user releases the trigger 680, the motion of the trigger pin 685 toward the pawl tab 688a rapidly disengages the set of teeth 688b of the pawl 687 from the sector gear 689. The rod 650 is then able to freely and rapidly rotate back to a baseline configuration where the cuff is displaced from the foot of the user, allowing the user to pull away from the pedal 610.

Figure 7A:
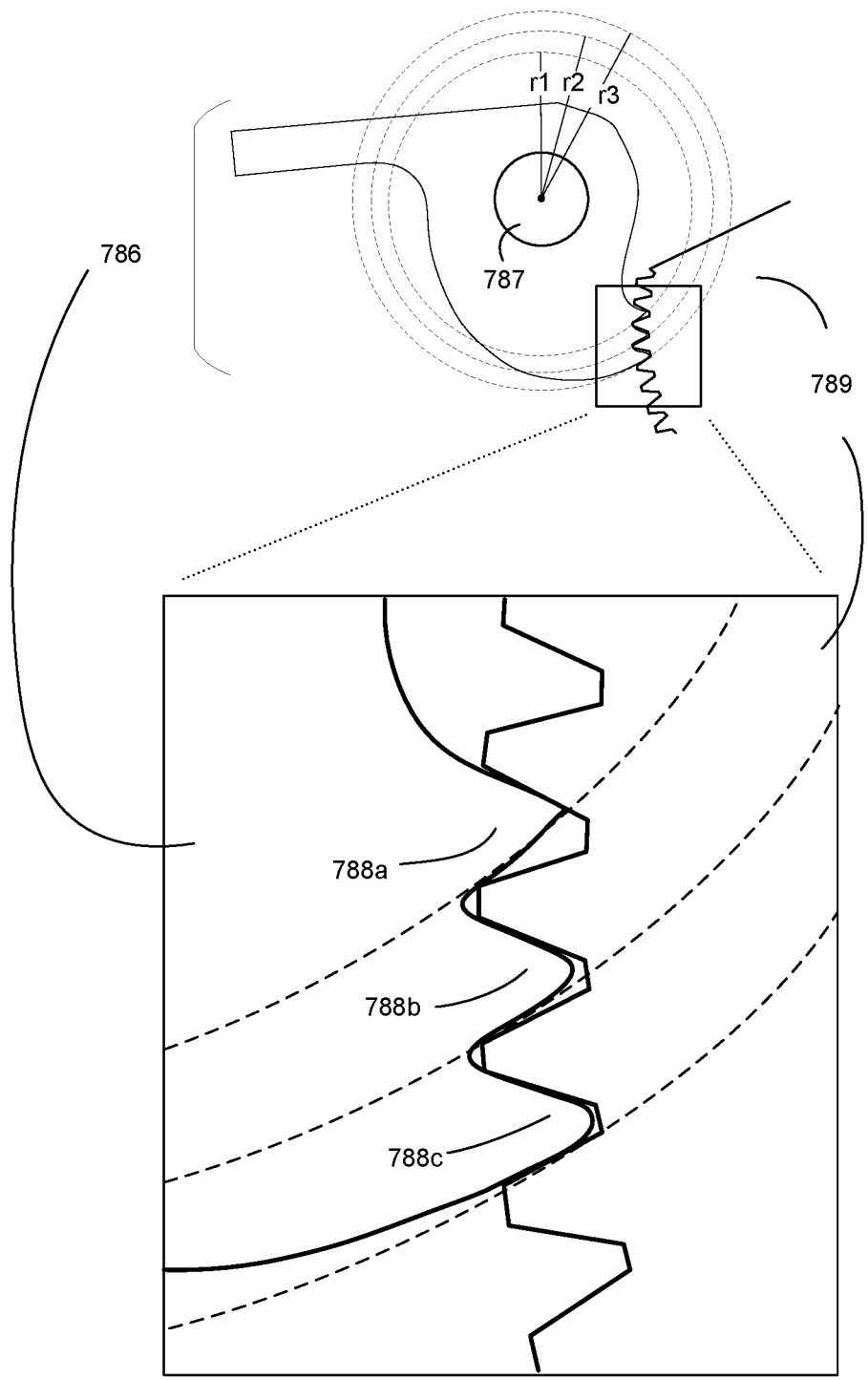
FIG. 7A shows a side view of a pawl and a sector gear, in accordance with one embodiment.

FIG. 7A shows a side view of a pawl 786 and a sector gear 789, in accordance with one or more embodiments. The pawl 786 and sector gear 789, in combination with operation of the trigger and trigger pin described above, can provide a variation of the locking subsystem 185 described with respect to FIGS. 1B and 1C. In particular, the configuration and morphology of components of the pawl 786 and sector gear 789 can allow components of the system, such as the cuff and arm coupled to the cuff, to reliably lock in position in the engaged mode, but to rapidly be unlocked in the disengaged mode so that the user can release his or her foot from the system.

As shown in FIG. 7A, the bore 787 of the pawl 786 through which the pawl pin passes defines circular reference geometry associated with a set of teeth, including teeth 788a, 788b, and 788c of the pawl 786 that interface with the sector gear 789. In relation to the circular reference geometry, biting edges of the set of teeth (i.e., edges that contact the sector gear in the engaged mode) have angles (e.g., profile angles or pressure angles) defined by arcs of concentric circles centered about the center point of the circular reference geometry. As shown in FIG. 7A, a first tooth 788a corresponds to (e.g., has a biting edge surface tangential to) a first concentric circle having a first radius, a second tooth 788b corresponds to (e.g., has a biting edge surface tangential to) a second concentric circle having a second radius, and a third tooth 788c corresponds to (e.g., has a biting edge surface tangential to) a third concentric circle having a third radius, where the second radius is longer than the first radius by an incremental length and the third radius is longer than the second radius by the incremental length. The first tooth 788a thus fills a first volume of its corresponding sector gear space, the second tooth 788b fills a second volume (larger than the first volume) of its corresponding sector gear space, and the third tooth 788c fills a third volume (larger than the second volume) of its corresponding sector gear space in the engaged mode of the system.

Figure 7B:
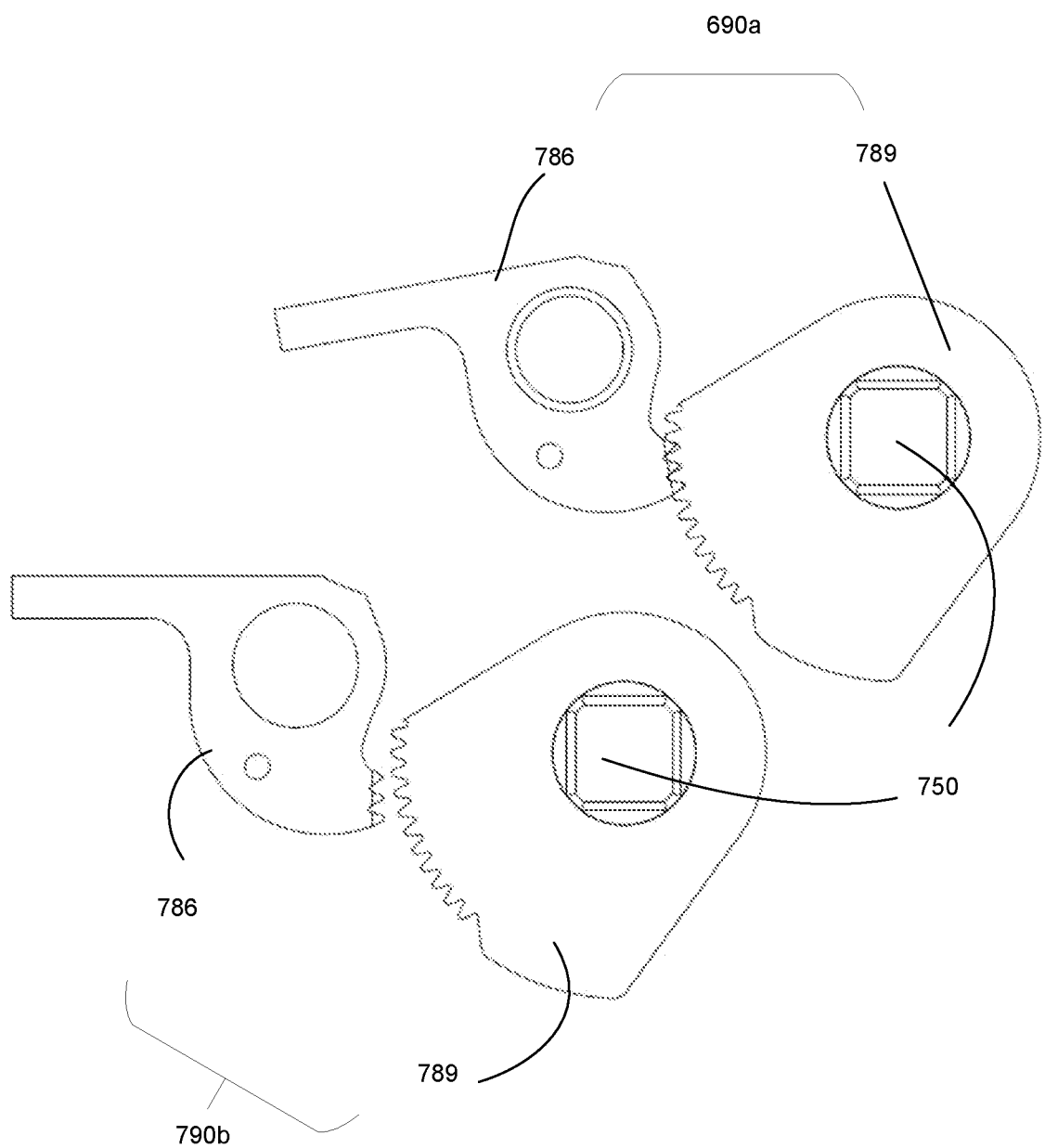
FIG. 7B is a diagram shows operation modes of the pawl and the sector gear of FIG. 7A, in accordance with one embodiment.

FIG. 7B depicts side views of interactions between the pawl 786 and sector gear 789 in an engaged mode 790a and a disengaged mode 790b, in association with the engaged modes and disengaged modes described above. In the engaged mode 790a, the set of teeth of the pawl 786 are in contact with teeth of the sector gear, thereby allowing the position of the rod 750 (and the cuff, not shown) to be locked in position to facilitate retention of the user's foot at the pedal. Then, in the disengaged mode 790b, the set of teeth of the pawl 786 do not contact teeth of the sector gear, thereby allowing the rod 750 (and the cuff, not shown) to rotate freely to facilitate release of the user's foot from the pedal.

Various embodiments of the pawl shown in FIGS. 7A and 7B can alternatively have any other suitable morphology (e.g., in terms of number of teeth, reference features, tooth thicknesses, tooth angles, depths, tooth clearances, etc.). Similarly, the sector gear can have any other suitable morphology (e.g., arc over which sector gear teeth span, number of teeth, tooth thicknesses, tooth angles, tooth depths, tooth clearances, etc.) in relation to proper operation of the locking subsystem associated with the pawl 786 and sector gear 789.

Figure 8A:
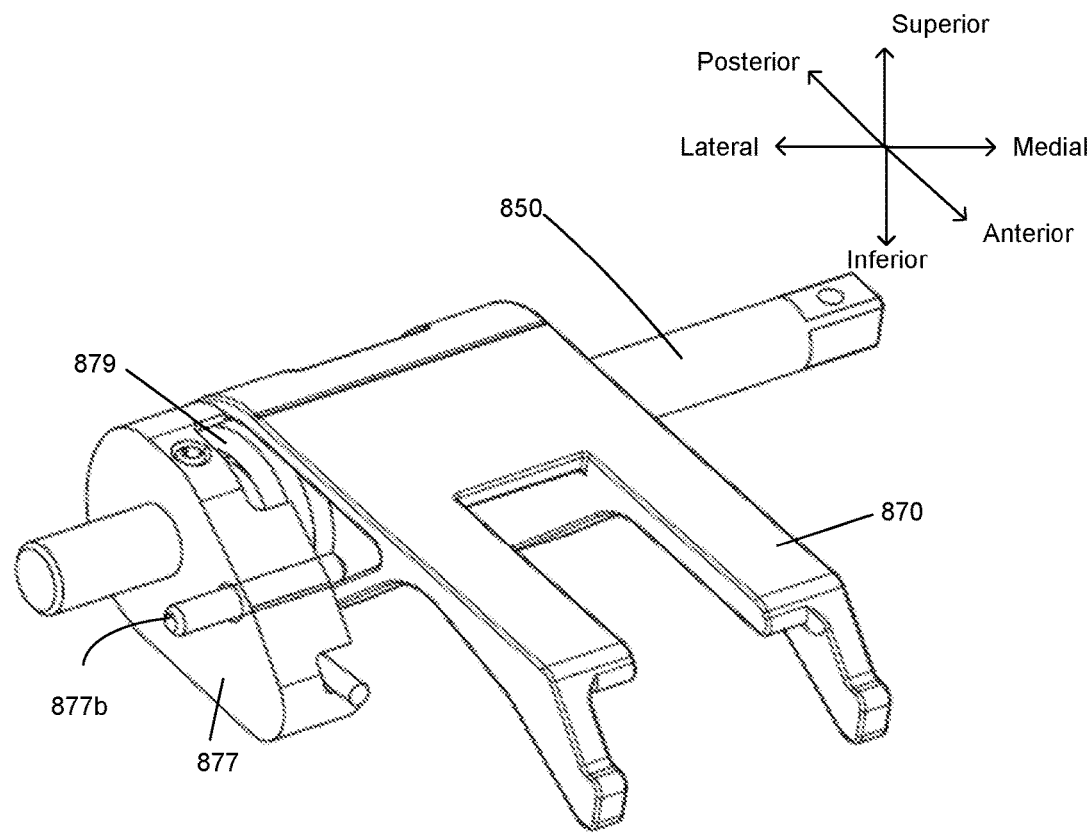
FIG. 8A is a perspective view of elements that facilitate reception of various foot or footwear by the pedal system, in accordance with one embodiment.
Figure 8B:
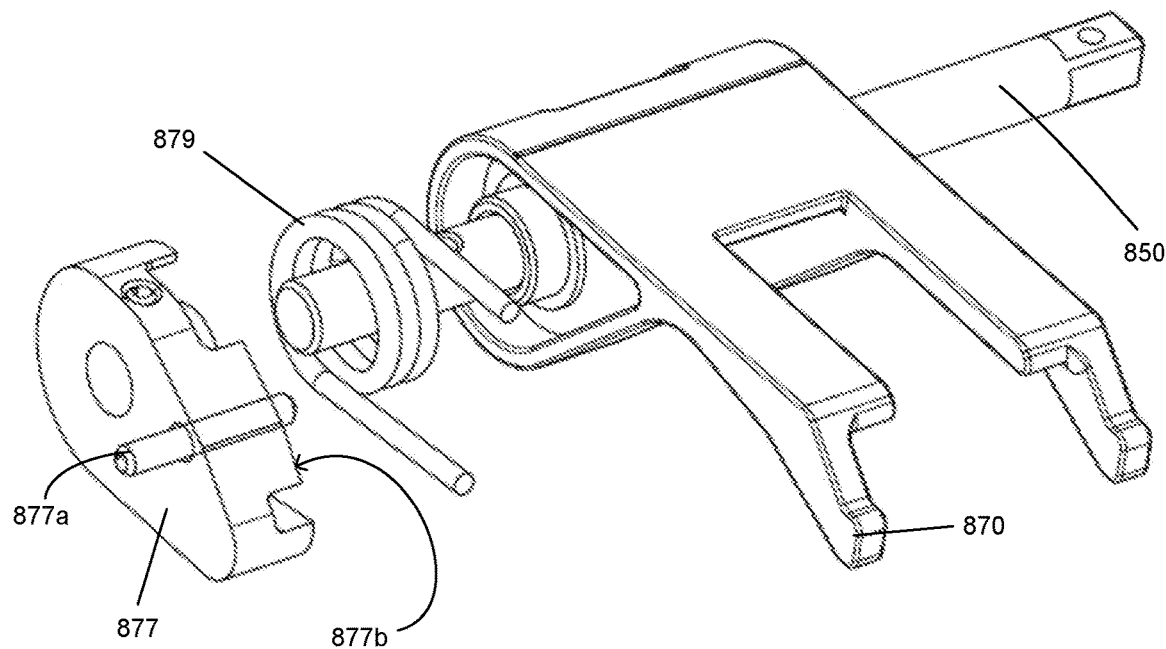
FIG. 8B is an exploded view of the elements of FIG. 8A, in accordance with one embodiment.

FIG. 8A is a perspective view of elements that facilitate reception of various foot or footwear by the pedal system, in accordance with one embodiment. FIG. 8B is an exploded view of the elements of FIG. 8A, in accordance with one embodiment. Elements of FIGS. 8A and 8B provide a mechanism for allowing the cuff to comfortably retain various foot sizes at the pedal, with a substantially similar levels of force regardless of foot size. As such, in the engaged mode 690a described above in relation to FIG. 6C, after a given level of compression is achieved between the cuff and the pedal, the cuff position locks in place without further compressing the foot of the user.

The rod 850 and lever 870 are variations of the rod and lever described in accordance with one or more embodiments and variations above.

The arbor 877 (shown in FIG. 2D as arbor 277) is coupled to the rod 850 and fixed to rotate with the rod 850 about the axis defined by the rod 750. The arbor 877 includes a pin 877a (shown in FIG. 2D as arbor 277a) that couples it to the lever 870 (i.e., to a lateral side of the lever 870) and maintains alignment between the arbor 877 and the lever 870. The arbor 877 also has a cavity 877b for receiving and positioning a torsion spring 879 (shown in FIG. 2D as torsion spring 279) between the arbor 877 and the lever 870. The torsion spring 879 has an end coupled to the arbor (e.g., seated within a channel of the cavity 877b of the arbor 877) and an end coupled to the lever, and allows the lever 870 to continue to rotate (e.g., in response to a force applied to the user's foot at the lever 870) while preventing the cuff (coupled to the rod 850 and not shown) from applying beyond a threshold level of force to the foot of the user at the pedal. As such, after a force applied to the user's foot by the cuff and the pedal reaches a certain level, additional forces generated by further rotation of the lever 870 as the user fully steps onto the pedal are absorbed by the torsion spring 879 within the arbor 877.

In material composition, the arbor 877 is composed of a steel material (e.g., steel plated material, 303 stainless steel, etc.) that is robust against torsional stresses and compressive stresses in relation to forces applied to the arbor 877 by the torsion spring 879, the rod 850, and the lever 870 as the lever 870 rotates. In material composition, the torsion spring is composed of zinc plated music wire providing an appropriate spring force to control the threshold level of force applied to the user's foot by the cuff. Various embodiments of the arbor 877 and the torsion spring 879 can, however, be composed of any other suitable material.

Figure 9A:
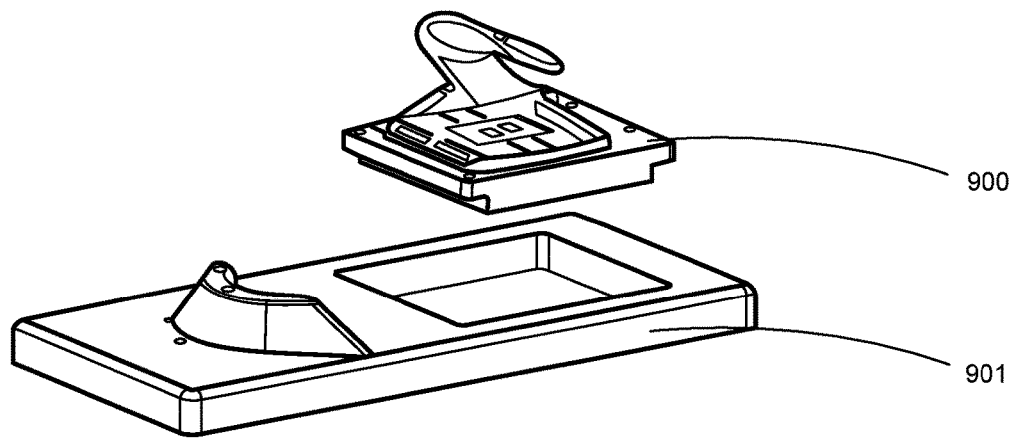
FIG. 9A depicts a partially exploded view of the pedal system, in accordance with one embodiment.

FIG. 9A depicts a partially exploded view of the pedal system, in accordance with one embodiment, where the variation of the pedal system 900 can be coupled to another substrate 901. The substrate 901 can be associated with a foot receiving component of another apparatus, sporting equipment (e.g., rowing machine, recumbent bike, elliptical, etc.), or transportation system (e.g., motorcycle, moped), where some level of retention of the user's feet is desired.

Figure 9B:
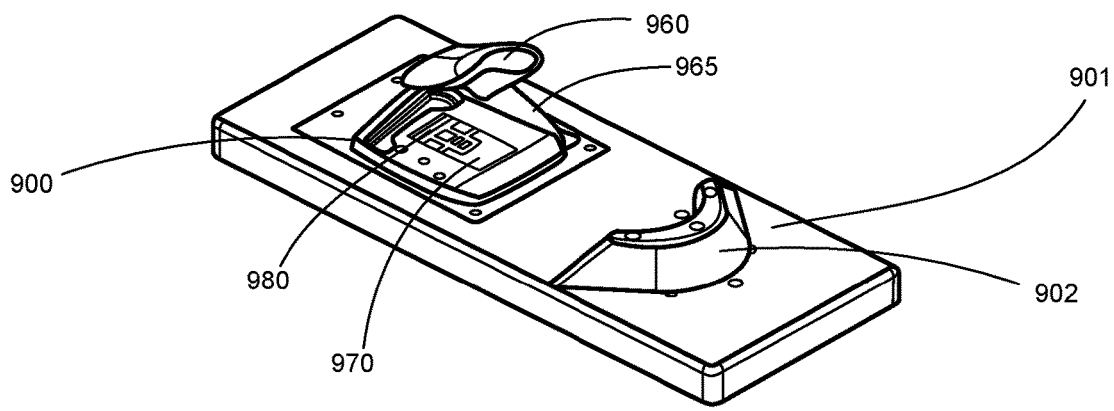
FIG. 9B depicts a perspective view of the pedal system of FIG. 9A in an assembled state, according to one embodiment.

FIG. 9B depicts a perspective view of the pedal system of FIG. 9A in an assembled state, according to one embodiment, where the pedal system 900 includes a cuff 960, arm 965 coupled to the cuff 960, lever 970, and trigger 980, which are variations of the cuff 160, arm 165 coupled to the cuff 160, lever 170, and trigger 180 shown in FIGS. 1B and 1C. Other components (not shown) of the pedal system 900 can include variations of the rod 150, locking subsystem 185, main drive shaft 120, and plunger 130 of the pedal system 100 shown in FIGS. 1A-1C, in relation to different operation modes. In the variation shown in FIG. 9B, the substrate 901 also includes a heel stop 902 that positions and/or retains a posterior region of a user's foot between the substrate 901 and the system 900.

Figure 9C:
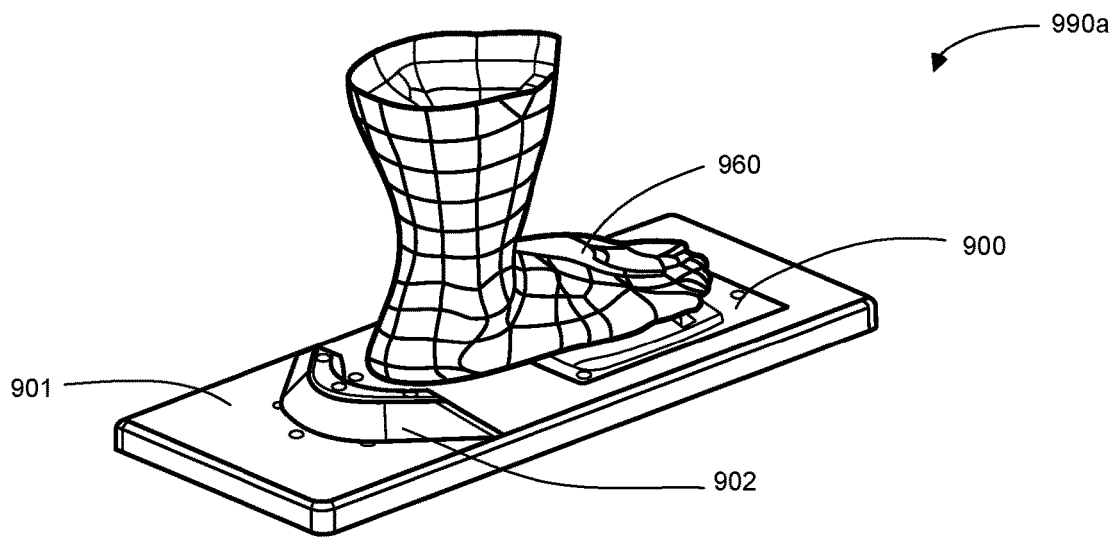
FIG. 9C is a diagram illustrating a user's foot or footwear placed on the pedal system of FIGS. 9A and 9B, according to one embodiment.

FIG. 9C is a diagram illustrating a user's foot or footwear placed on the pedal system of FIGS. 9A and 9B, according to one embodiment, where a user's foot is retained between the substrate 901 and the cuff 960, with the heel stop 902 providing a position marker for the user's foot in relation to proper positioning of the user's foot at the pedal system 900.

While embodiments, variations, and examples of pedal systems are described above, the pedal system(s) can additionally or alternatively include any other suitable elements that promote retention and/or release of a foot of a user. Furthermore, sub elements (e.g., sub elements of a trigger, sub elements of a lever, sub elements of a main drive shaft, etc.) described in relation to a main elements above can, in alternative variations, be swapped across other main elements to achieve alternative variations of described mechanisms.

FIG. 10 is a flowchart illustrating a method changing pedal configuration, in accordance with one embodiment. The method 900 of FIG. 10 may be performed by an embodiment or variation of the pedal system described above with reference to FIGS. 1A, 3A-3C, and 4.

The pedal system includes a pedal, a main drive shaft rotatably coupled to the pedal, and a plunger that engages 1010 the main drive shaft to prevent rotation of the pedal relative to the main drive in a locked mode. Engagement of the main drive shaft by the plunger can be controlled by a trigger of the pedal system and a spring coupled to the plunger that provides a counter force to a force applied by the trigger, where the trigger and spring can move in response to an applied force or a removed force (e.g., a torsional force), and subsequently transfer force to the plunger. The pedal, main drive shaft, plunger, and trigger can be embodiments or variations of the pedal, main drive shaft, plunger, and trigger described above. Furthermore, as described above, the pedal, main drive shaft, plunger, and trigger can include, be coupled to, or otherwise be associated with bearings, bushings, pins, guides, linear springs, torsional springs, and/or any other suitable elements that constrain motion, guide motion, provide a biasing force, provide a restoring force, and/or affect movement of the elements in any other suitable manner.

In engaging 1010 the main drive shaft, the plunger can engage an active region of the main drive shaft, where the active region can be a region having morphological features and/or physically active features (e.g., magnetic features) that can be interacted with by the plunger. As such, responsive to engaging a main drive shaft of a pedal with a plunger, the method 1000 can include placing the pedal in a locked mode to prevent rotation of the pedal relative to the main drive shaft. In a first variation, the active region includes a polygonal prismatic segment of the main drive shaft having sides that can be physically obstructed by a region of the plunger. In another variation, the active region includes a magnetic element coupled to the main drive shaft that can be interacted with by a corresponding magnetic element of the plunger to obstruct motion of the main drive shaft. As such, engaging the main drive shaft can include translating a first region of the plunger into physical or non-physical contact with an active region of the main drive shaft, and in more detail can include establishing physical contact between a flat surface of the plunger and a face of a polygonal prismatic segment of the main drive shaft. Other variations of the active region can operate in any other suitable manner.

The plunger of the pedal system can also disengage 1020 the main drive shaft to enable rotation of the pedal relative to the main drive shaft in a released mode. As such, the method 1000 can include: responsive to disengaging the main drive shaft from the plunger, placing the pedal in the released mode to enable rotation of the pedal relative to the main drive shaft. Disengagement of the main drive shaft by the plunger can be controlled by the trigger of the pedal system and a spring coupled to the plunger that provides a counter force to a force applied by the trigger, where the trigger and spring can move in response to an applied force or a removed force (e.g., a torsional force), and subsequently transfer force to the plunger. As such, disengaging the main drive shaft can include translating a second region of the plunger into physical separation from an active region of the main drive shaft. In relation to the released mode, disengaging the main drive shaft by the plunger can include disengaging the active region of the main drive shaft to allow the pedal to rotate relative to the main drive shaft.

The method 1000 can be performed cyclically, such that the pedal can be repeatedly transitioned between the locked mode and the released mode any suitable number of times. In relation to transitioning between modes, the method 900 can thus include: responsive to displacing the plunger relative to the main drive shaft, transitioning between the locked mode and the released mode.

As shown in FIG. 10, the pedal system 1000 can optionally bypass 1030 the locked mode by allowing the main drive shaft to be physically displaced from the plunger. The pedal system can include one or more compressible caps positioned between the main drive shaft and another surface of the pedal, as described above. Thus, even when the plunger engages the main drive shaft, the compressible cap(s) can compress and allow the main drive shaft to be displaced relative to the plunger if a sufficient force is applied to the main drive shaft.

In relation to bypassing the locked mode, the plunger can also be back driven in order to disengage the plunger from the main drive shaft.

Figure 11:
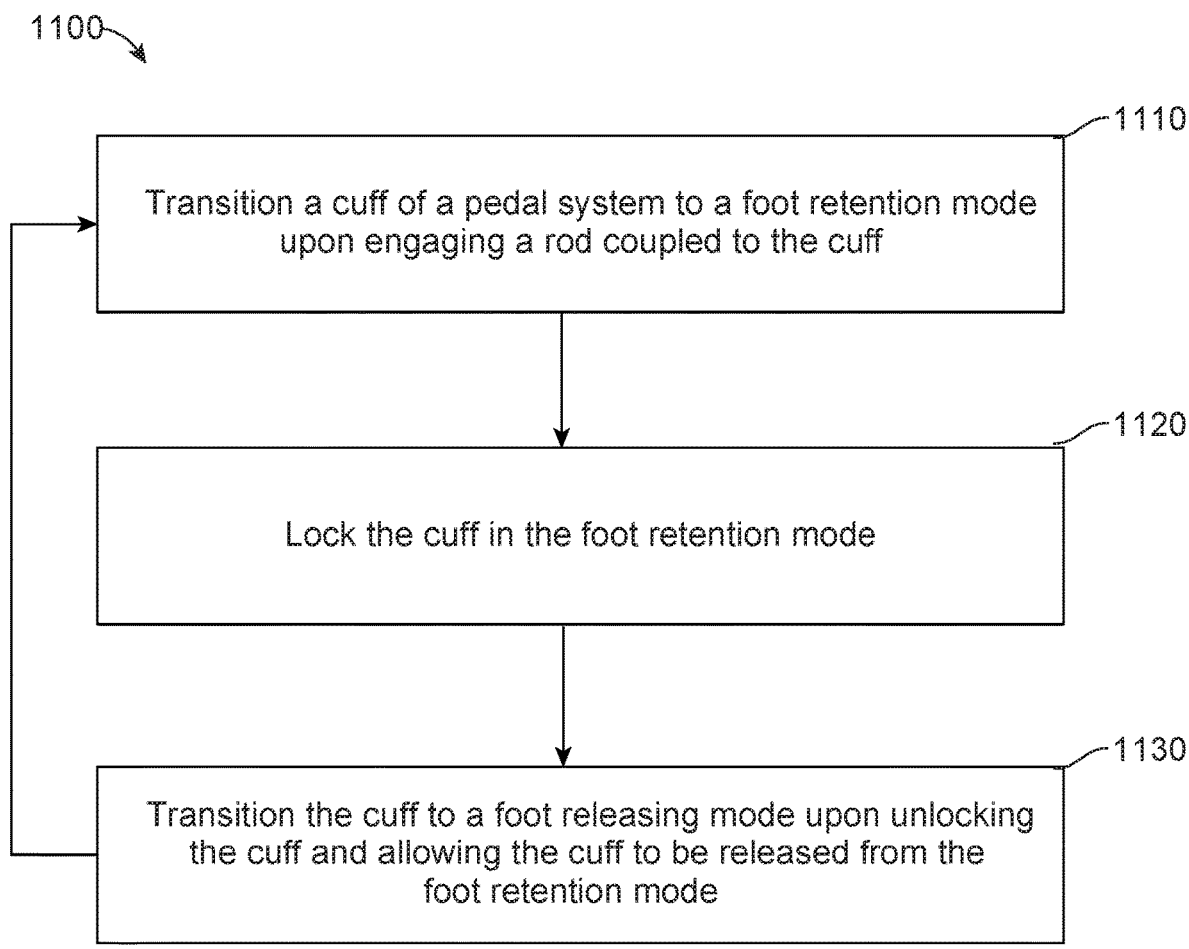
FIG. 11 is a flowchart illustrating a method for changing pedal configuration, in accordance with another embodiment.

FIG. 11 is a flowchart illustrating a method for changing pedal configuration, in accordance with another embodiment. The method 1000 of FIG. 11 may be performed by an embodiment or variation of the pedal system described above.

The pedal system includes a pedal, a rod rotatably coupled to the pedal, a cuff coupled to the rod, a lever coupled to the rod that controls movement of the cuff, a locking subsystem that causes locking of the cuff, and a trigger coupled to the locking subsystem. The lever transitions 1110 the cuff of the pedal system to a foot retention mode upon engaging the rod coupled to the cuff. Motion of the rod by the lever can occur simultaneously with motion of the trigger (e.g., due to coupling between the rod and the lever in certain directions of motion, as described above). Furthermore, motion of the trigger and/or the lever can occur against a biasing force provided by a torsion spring coupled to the lever and/or trigger and to a surface of the pedal, as described above. As such, a force applied to the trigger and to the lever (e.g., a torsional force) can cause the rod to rotate, thereby changing a position of the cuff. The pedal, rod, cuff, lever, locking subsystem, and trigger can be embodiments or variations of the pedal, rod, cuff, lever, locking subsystem, and trigger described above. Furthermore, as described above, the pedal, rod, cuff, lever, locking subsystem, and trigger can include, be coupled to, or otherwise be associated with bearings, bushings, pins, guides, linear springs, torsional springs, and/or any other suitable elements that constrain motion, guide motion, provide a biasing force, provide a restoring force, and/or affect movement of the elements in any other suitable manner.

Motion of the trigger can also cause locking 1120 of the cuff in the foot retention mode, where a component of the trigger interacts with the locking subsystem to transition the locking subsystem between different states of operation. As described above, the locking subsystem can operate by way of a pawl and a sector gear, where, as the trigger is rotated, a trigger pin coupled to the trigger comes out of contact with a portion of the pawl, allowing teeth of the pawl to come into contact with teeth of the sector gear, thereby allowing the cuff to ratchet toward the user's foot and comfortably compress the user's foot at the pedal.

As described above, locking 1120 of the cuff by the locking subsystem can include locking the cuff in the foot retention mode without exceeding a threshold level of force applied to the user's foot between the cuff and the pedal. Locking without exceeding the threshold force level be implemented in coordination with an arbor coupled to the rod and to the lever, and torsion spring coupled to the arbor and to the lever, where the arbor and torsion spring allows the lever to continue to rotate (e.g., in response to a force applied to the user's foot at the lever) while preventing the cuff from applying beyond a threshold level of force to the foot of the user at the pedal. As such, once a force applied to the user's foot by the cuff and the pedal reaches a certain level, additional forces generated by further rotation of the lever as the user fully steps onto the pedal are absorbed by the torsion spring and the arbor.

As shown in FIG. 11, the pedal system can also transition 1130 the cuff to a foot releasing mode responsive to unlocking the cuff and allowing the cuff to be released from the foot retention mode. Unlocking the cuff can occur in response to an interaction between the trigger and the locking subsystem. In more detail, the trigger pin coupled to the trigger can rapidly push the pawl out of contact with the sector gear as the user removes his or her foot from the pedal, based upon the restoring force provided by the torsion spring coupled to the trigger. Unlocking the locking subsystem can then allow the lever to be rotated back to its baseline position, allowing the cuff to return to a fully open position.

In relation to transitioning 1130 the cuff to the foot releasing mode, unlocking of the cuff can occur rapidly due to features of the pawl. In more detail, a set of teeth of the pawl can include biting edges with different angles (e.g., profile angles or pressure angles) defined by arcs of concentric circles centered about an axis of rotation of the pawl relative to the pedal. A first tooth of the pawl can be associated with a first concentric circle having a first radius, a second tooth can be associated with a second concentric circle having a second radius, and a third tooth can be associated with a third concentric circle having a third radius, where the second radius is longer than the first radius by an incremental length and the third radius is longer than the second radius by the incremental length. The first tooth thus fills a first volume of its corresponding sector gear space, the second tooth fills a second volume (larger than the first volume) of its corresponding sector gear space, and the third tooth fills a third volume (larger than the second volume) of its corresponding sector gear space. This configuration can allow the locking subsystem provided by the pawl and the sector gear to be rapidly released in relation to transitioning 1030 the cuff to the foot releasing mode.

The method 1100 can be performed cyclically, such that the pedal system can be repeatedly transitioned between the foot retention mode and the foot releasing mode any suitable number of times. Furthermore, the methods 900 and 1000 can be implemented simultaneously, for instance, in response to motion of the trigger performing multiple actions simultaneously (e.g., in interacting with a plunger and a locking subsystem contemporaneously to produce multiple responses in the system).

While embodiments, variations, and examples of pedal systems are described above, the pedal system(s) can additionally or alternatively include any other suitable elements that promote retention and/or release of a foot of a user. Furthermore, sub elements (e.g., sub elements of a trigger, sub elements of a lever, sub elements of a main drive shaft, etc.) described in relation to a main elements above can, in alternative variations, be swapped across other main elements to achieve alternative variations of described mechanisms.

CONCLUSION

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A pedal system, the system comprising:
    a pedal having a top surface and an internal cavity, wherein the internal cavity is defined by the top surface and a pair of side walls extending from the top surface;
    a rod secured to the pedal in a rotatable manner, the rod extending through the internal cavity;
    a cuff rotatably coupled to the rod, the cuff configured to rotate about the rod;
    a lever coupled at a first lever region to the rod and exposed at a second lever region through the top surface and configured to retain a footwear at the top surface in an engaged mode in conjunction with the cuff and to release footwear from the top surface in a disengaged mode, wherein the lever is coupled to the rod within the internal cavity and the second lever region extends through an opening of the top surface, wherein the trigger is configured to rotate independently of rotation of the rod in transitioning between the engaged mode and the disengaged mode; and
    a trigger coupled to the rod and configured to cause locking of a position of the cuff in the engaged mode and cause unlocking of the position of the cuff in the disengaged mode, wherein the trigger comprises a trigger pin extending from a body of the trigger within the internal cavity, and
wherein the pedal further comprises a locking subsystem retained within the internal cavity, the locking subsystem interacting with the trigger pin in transitions between the engaged mode and the disengaged mode,
wherein the locking subsystem comprises a pawl having a pawl tab that lies within a path of motion of the trigger pin within the internal cavity, a central bore that defines a rotational axis of the pawl, and a set of teeth,
wherein edges of the set of teeth have angles defined by arcs of concentric circles centered about the central bore, and wherein the set of teeth comprises a first tooth associated with a first concentric circle having a first radius, a second tooth associated with a second concentric circle having a second radius, and a third tooth associated with a third concentric circle having a third radius, wherein the second radius is longer than the first radius by a predetermined length and the third radius is longer than the second radius by the predetermined length.

2. The pedal system of claim 1, wherein the cuff is coupled to the rod by an arm at a medial side of the pedal and is uncoupled from the pedal at a lateral side of the pedal, and wherein rotation of the rod, in response to a force applied to the lever, moves the cuff relative to the top surface of the pedal.

3. The pedal system of claim 1, wherein the lever comprises a tab and the trigger comprises a portion that engages the tab and that couples motion of the trigger with the lever in transitioning from the disengaged mode to the engaged mode.

4. The pedal system of claim 3, wherein motion of the trigger is uncoupled from motion of the lever responsive to transitioning from the engaged mode to the disengaged mode.

5. The pedal system of claim 1, wherein the pawl tab contacts the trigger pin in the disengaged mode, thereby unlocking the position of the cuff, and wherein the pawl tab is physically separated from the trigger pin in the engaged mode, thereby locking the position of the cuff.

6. The pedal system of claim 1, wherein the locking subsystem further comprises a sector gear having a set of gear teeth that engage the set of teeth of the pawl in the engaged mode and disengage the set of teeth of the pawl in the disengaged mode.

7. The pedal system of claim 1, wherein the pedal is configured to couple to a crank arm of a bicycle.

* * * * *